(12) United States Patent
Zheng et al.

(10) Patent No.: US 12,531,786 B2
(45) Date of Patent: Jan. 20, 2026

(54) LINK-LEVEL NETWORK VIRTUALIZATION ARCHITECTURE FOR LARGE-SCALE NETWORK FUNCTION VIRTUALIZATION APPLICATIONS

(71) Applicant: Fortinet, Inc., Sunnyvale, CA (US)

(72) Inventors: Jie Zheng, Sunnyvale, CA (US); Hongbin Lu, Sunnyvale, CA (US)

(73) Assignee: Fortinet, Inc., Sunnyvale, CA (US)

( * ) Notice: Subject to any disclaimer, the term of this patent is extended or adjusted under 35 U.S.C. 154(b) by 33 days.

(21) Appl. No.: 18/758,042

(22) Filed: Jun. 28, 2024

(65) Prior Publication Data

US 2026/0005927 A1    Jan. 1, 2026

(51) Int. Cl.
*H04L 41/122* (2022.01)
*H04L 41/14* (2022.01)
*H04L 49/00* (2022.01)

(52) U.S. Cl.
CPC .......... *H04L 41/122* (2022.05); *H04L 41/145* (2013.01); *H04L 49/70* (2013.01)

(58) Field of Classification Search
CPC ..... H04L 41/122; H04L 41/145; H04L 49/70; G06F 9/45558; G06F 2009/45595
See application file for complete search history.

(56) References Cited

U.S. PATENT DOCUMENTS

| | | | |
|---|---|---|---|
| 7,701,957 B1* | 4/2010 | Bicknell | H04L 12/4625 370/467 |
| 8,705,536 B2* | 4/2014 | Subrahmaniam | H04L 47/2441 370/392 |
| 10,250,488 B2* | 4/2019 | Cropper | H04L 67/535 |
| 12,170,583 B1* | 12/2024 | Yang | H04L 61/5007 |
| 2009/0083445 A1* | 3/2009 | Ganga | G06F 15/16 709/250 |
| 2010/0238837 A1* | 9/2010 | Zheng | H04L 41/0806 370/254 |
| 2012/0033672 A1* | 2/2012 | Page | H04L 49/552 370/395.53 |
| 2017/0019369 A1* | 1/2017 | Ravinoothala | H04L 47/125 |
| 2019/0140937 A1* | 5/2019 | Kumar | H04L 45/127 |
| 2020/0280537 A1* | 9/2020 | Alapati | H04L 61/5007 |
| 2023/0269182 A1* | 8/2023 | Li | H04L 69/163 370/392 |
| 2023/0409254 A1* | 12/2023 | Yuan | G06F 3/1208 |

* cited by examiner

*Primary Examiner* — Muhammad Raza
(74) *Attorney, Agent, or Firm* — Jaffery Watson Hamilton & DeSanctis LLP

(57) ABSTRACT

A virtualized network function (VNF) of a network function virtualization (NFV) link level architecture includes a management plane function (MPF) to map a logical interface as a virtual interface in a control plane function (CPF) of the VNF. The MPF maps a logical resource of the NFV virtualization link level architecture as a shadow resource on one or more data plane functions (DPFs) of the VNF, wherein a virtual link is formed by the logical interface, the shadow resource, and the virtual interface. One of the DPFs receives a packet over the virtual link from a switch and classifies a type of the packet. In response to the packet type being a data packet, the DPF aggregates the packet with other data packets to form aggregated data packets and sends the aggregated data packets to the switch.

19 Claims, 15 Drawing Sheets

ACTIVE LINKS [DPF-1, DPF-2] --> ACTIVE LINKS [DPF-1]

LINK-LEVEL NETWORK VIRTUALIZATION ARCHITECTURE FOR LARGE-SCALE NETWORK FUNCTION VIRTUALIZATION APPLICATIONS

BACKGROUND

Various embodiments of the present disclosure generally relate to network virtualization processing in a computing system. In particular, some embodiments relate to a link-level network virtualization architecture for building and managing large-scale network function virtualization (NFV) applications in a computing system.

In deployment of NFV applications, network functions are virtualized and often run on relatively cheap, commercial off-the-shelf (COTS) computing system hardware, such as computer servers based on the x86 processor architecture and network switches. However, implementation of a single virtual network function (VNF) in a computer server typically provides poor performance characteristics as compared to a specialized hardware-based network function. Multiple VNFs may be implemented in a computer server, but efficiently managing the multiple VNFs is problematic.

SUMMARY

Systems and methods are described for providing and managing multiple VNFs in a computing system that integrates compute and network resources together and delivers network traffic in a flexible, scalable and highly available manner. According to one embodiment, a VNF of a NFV link level architecture includes a management plane function (MPF) to map a logical interface as a virtual interface in a control plane function (CPF) of the VNF. The MPF maps a logical resource of the NFV virtualization link level architecture as a shadow resource on one or more data plane functions (DPFs) of the VNF, wherein a virtual link is formed by the logical interface, the shadow resource, and the virtual interface. One of the DPFs receives a packet over the virtual link from a switch and classifies a type of the packet. In response to the packet type being a data packet, the DPF aggregates the packet with other data packets to form aggregated data packets and sends the aggregated data packets to the switch. In response to the packet type being a link aggregation control protocol (LACP) packet, the DPF sends the packet to a virtual link controller of the CPF to maintain a runtime state of the virtual link identified in the packet. In response to the packet type being at least one of an address resolution protocol (ARP) packet and an Internet protocol (IP) neighbor discovery packet, the DPF sends the packet to an IP neighbor manager in the CPF to maintain a link layer address database. In response to the packet type being a routing protocols packet, the DPF sends the packet to a routing protocols manager in the CPF to process the routing protocols packet.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
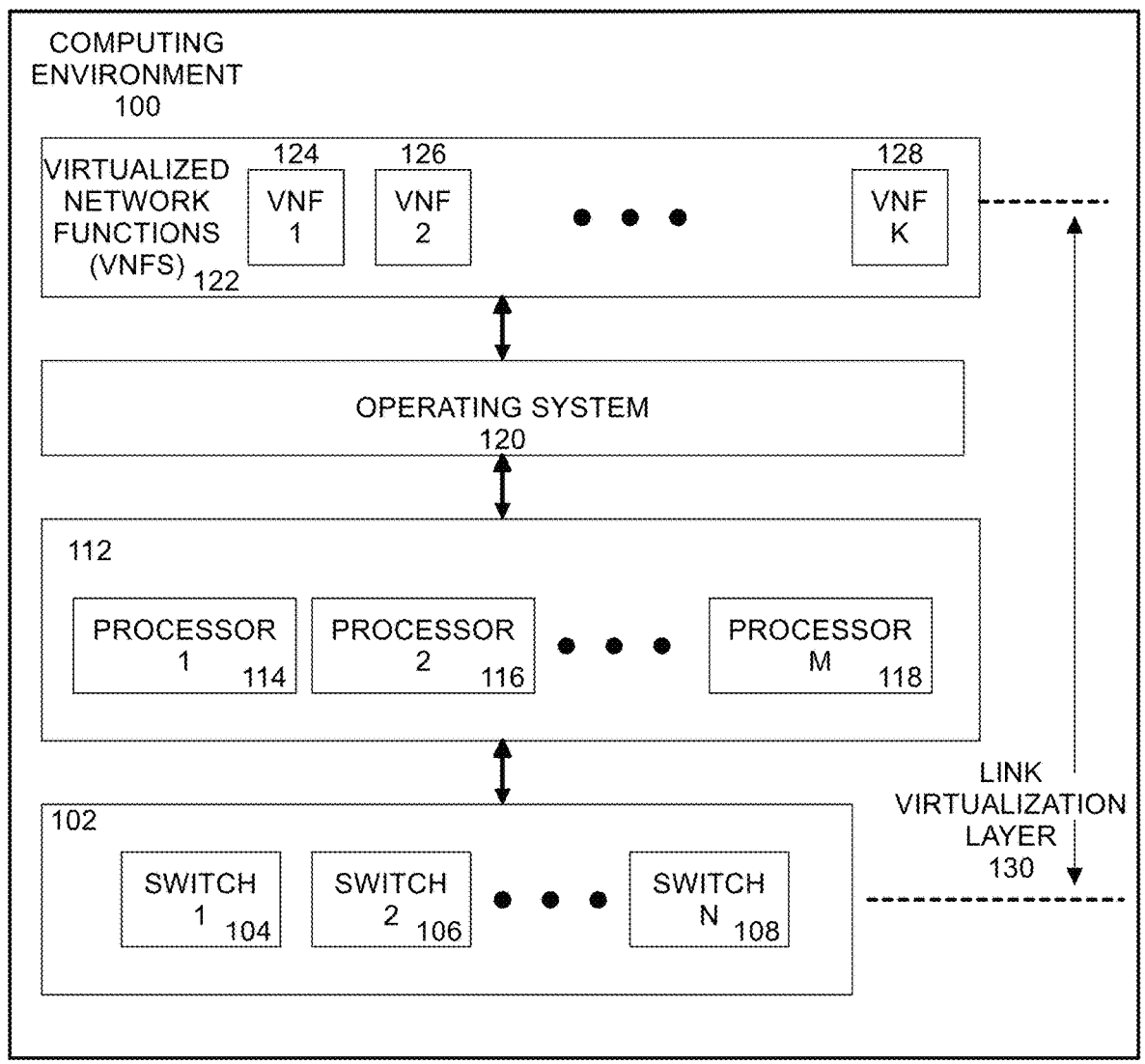
FIG. 1 illustrates a computing environment in which various embodiments of the present disclosure may be employed.

As the use of NFV increases, it is increasingly difficult for specialized virtualized network functions to meet requirements for scalability, throughput, latency, and reliability. Existing NFV infrastructures typically seek to lower total cost of ownership (TCO) by using commercial off the shelf (COTS) hardware. However, a single VNF is less efficient in handling a large traffic load due to the limited compute and network resources of a single COTS hardware-based system. Some current solutions use a cluster of individual VNFs working together logically as one VNF. There are several drawbacks of this existing framework. The existing framework relies on expensive external load balancers (e.g., an equal cost multi-path (ECMP) routing system) to distribute traffic to the members in the cluster, thereby resulting in extra management complexity and traffic latency. Users are aware of each VNF member and must manage each VNF separately. Users must also carefully split and allocate network resources for each member. It is complicated to deal with failover/scaling (e.g., migrating resources to other members in case of node failure), especially when network resources are not evenly distributed among members of the cluster. Furthermore, the deployment and operational costs are thus not decreased due to the introduced clustering complexities.

The technology described herein provides a link-level virtualization architecture for building large-scale NFV applications. This new NFV link-level architecture provides virtualization on top of low-level physical network links. No external load balancers are required. This saves significant hardware costs and reduces network complexities. The virtualization layer helps hide complexities from users. For example, users have a single view of network resources, and resources are shared by all members of the cluster, which greatly reduces operational complexities. The NFV link-level architecture described herein naturally provides high availability (HA) of computing capabilities as well as the ability to scale up and down processing capacity on the fly (dynamical scaling for changing traffic loads is a necessity for most NFV use cases).

The technology described herein provides at least several advantages and technical improvements over existing computing systems. Embodiments of the present disclosure lower the TCO for the NFV link-level architecture when building such NFV applications while providing better performance, flexibility and scalability than existing approaches. Embodiments of the present disclosure provide high performance because a single VNF in this NFV link-level architecture may handle traffic at a rate up to one or more terabits per second, which conventional individually hosted VNFs cannot match. Embodiments of the present disclosure provide simplicity in the NFV link-level architecture by providing a single user interface to users, and no resource splitting is required to configure virtualized network functions. Embodiments of the present disclosure provide high scalability thereby allowing users to deploy additional components on the fly to accommodate increasing traffic demands or decommission some running VNF components to save or reserve resources. Embodiments of the present disclosure also provide high flexibility since allocation and deallocation of resources may be performed dynamically.

In the following description, numerous specific details are set forth to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Brief definitions of terms used throughout this application are given below.

A "computer", "computer system" or "computing system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" or a "computing system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

Figure 2:
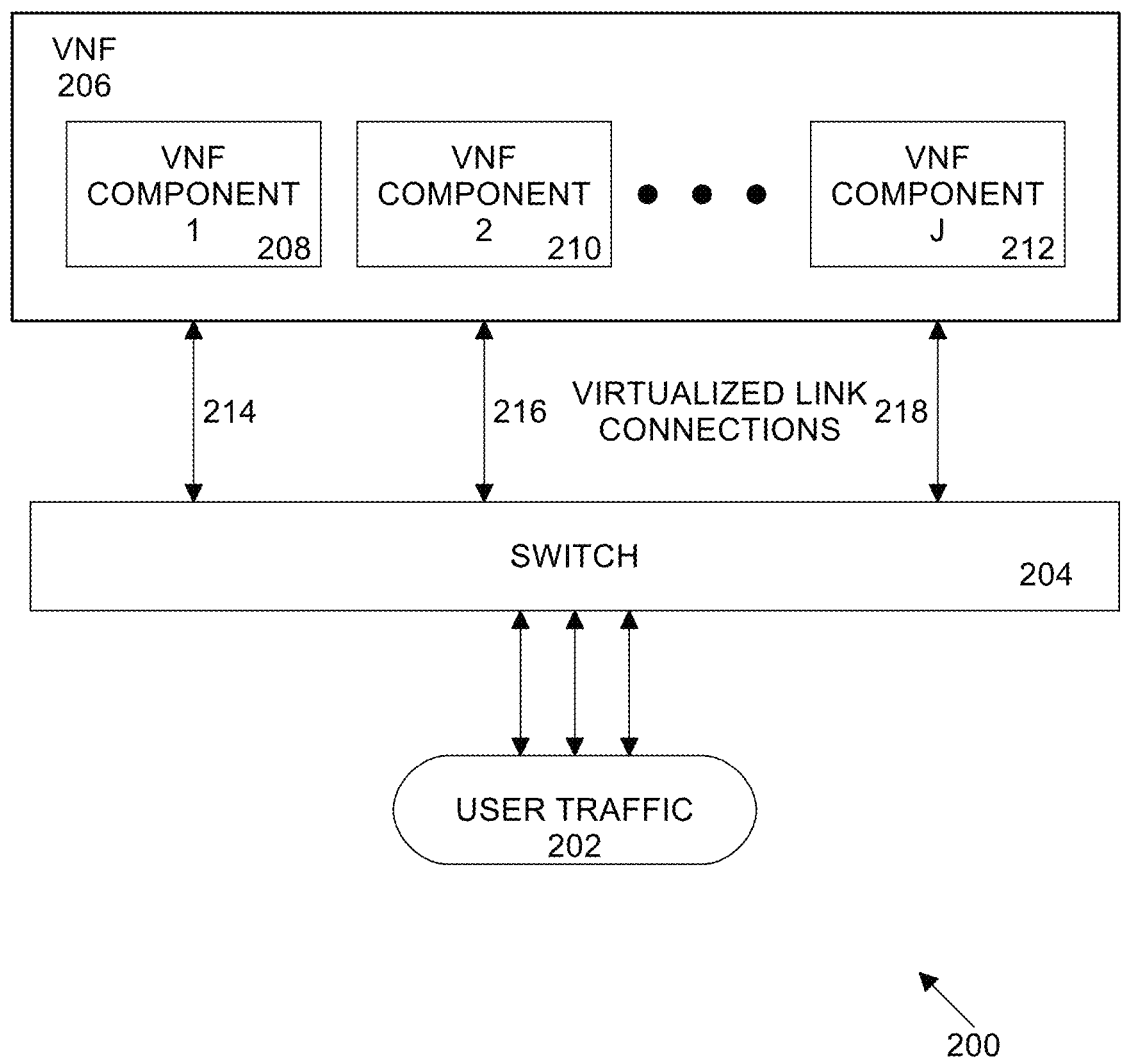
FIG. 2 illustrates component level clustering of VNF components in a NFV architecture according to an embodiment of the present disclosure.

FIG. 1 illustrates a computing environment 100 in which various embodiments of the present disclosure may be employed. Typically, users see an existing network device that runs network functions (e.g., routers/firewalls/deep packet inspection (DPI)/load balancers, etc.) as a black box with multiple network interface sockets. The existing network device hardware is vendor specific, so no vendors are able to develop functions based on network device hardware manufactured by others. NFV seeks to eliminate such "vendor lock-in" by deploying commodity computer servers and/or network device hardware running software-based network functions. At the top level, users will see an NFV architecture as an integral network function entity. In the NFV link-level architecture shown in FIG. 1, Ethernet switches and servers are organized into pool-based farms. For example, processor farm 112 includes one or more processors, such as processor 1 114, processor 2 116, . . . processor M 118, where M is a natural number and any processor may include one or more processing cores, and switch farm 102 includes one or more switches such as switch 1 104, switch 2 106, switch N 108, where N is a natural number. In an embodiment, the switches are Ethernet switches, but in other embodiments, other communications protocols may be implemented. Ethernet ports may be categorized into user-facing ports, which provide connectivity to other network devices of users or inter-connection ports, which provide inter-connectivity among servers and switches. Operating system (OS) 120 provides management services for the processors and switches, and manages one or more virtualized network functions (VNFs) 122, such as VNF 1 124, VNF 2 126, . . . . VNF K 128, where K is a natural number, including managing execution of the VNFs on the processors. In various embodiments, OS 120 may provision VNFs as virtual machines (VMs) or containers. In an embodiment, there may be any number of VNFs, processors, and switches in computing environment 100. In an embodiment, one or more VNF components may work together as a single logical VNF via link virtualization techniques described herein as link virtualization layer 130. As compared to a traditional network function, a VNF in the present architecture is agilely provisioned by clustering, while maintaining high scalability and performance FIG. 2 illustrates component level clustering of VNF components in a NFV link-level architecture 200 according to an embodiment of the present disclosure. A VNF 206 may include one or more VNF components (also denoted herein as VNF-C), such as VNF component 1 208, VNF component 2 210, . . . . VNF component J 212, where J is a natural number. In this example, VNF 206 is an instance of any of the VNFs shown in FIG. 1, such as VNF 1 124, VNF 2 126, . . . . VNF K 128. A VNF may provide any desired function (e.g., virtualized routers, firewalls, wide area network (WAN) optimization, network address translation (NAT) services, intrusion detection, virus scanners, broadband remote access servers, virtual customer premises equipment, directory services, domain name system (DNS) services, load balancing, caching, etc.). In an embodiment, VNF 206, including one or more constituent components (e.g., VNF component 1 208, VNF component 2 210, . . . . VNF component J 212), may work together as an individual functional entity.

In some existing systems, a switching fabric (not shown in FIG. 2) is needed to connect VNFs to a premise router (not shown in FIG. 2), which is typically performing ECMP routing. This existing VNF-level clustering has at least several drawbacks compared with the clustering implemented by the present NFV link-level architecture 200 described herein. Existing VNF-level clustering has external dependencies relying on external routers to distribute traffic to VNFs, causing deployment complexity; implements resource splitting so that in order for an individual VNF to work, resources such as routes/addresses/policies must be split for each VNF, and once a VNF is decommissioned, the associated resource must be carefully recycled and allocated to other active VNFs (thereby causing extra operational complexity); and results in higher capital expenditures (CapEx) and/or operational expenditures (OpEx) due to the presence of extra router devices and a simple clustering model. In addition, the presence of external routers introduces extra latency for user traffic.

In the NFV link-level architecture 200 described herein, users are always seeing an integral VNF, all VNF components work together as a logical unit, users have a central view of their resources, it is easy to apply the resources without any resource splitting, and the resources will not be recycled after one VNF component's decommissioning because all VNF components share a single and central resource. In an embodiment, a virtualized link connection may be implemented between a switch 204 (e.g., one of the switches of FIG. 1, such as switch 1 104, switch 2 106, . . . switch N 108) and each VNF component. For example, virtualized link connection 214 couples VNF component 1 208 to switch 204, virtualized link connection 216 couples VNF component 2 210 to switch 204, . . . virtualized link connection 218 couples VNF component J 212 to switch 204. Switch 204 receives user traffic 202 (e.g., control packets and/or data packets) and forwards the user traffic over one or more virtualized link connections 214, 216, . . . 218 to the respective VNF components 208, 210, . . . 212 of VNF 206 for processing of the packets.

Figure 3:
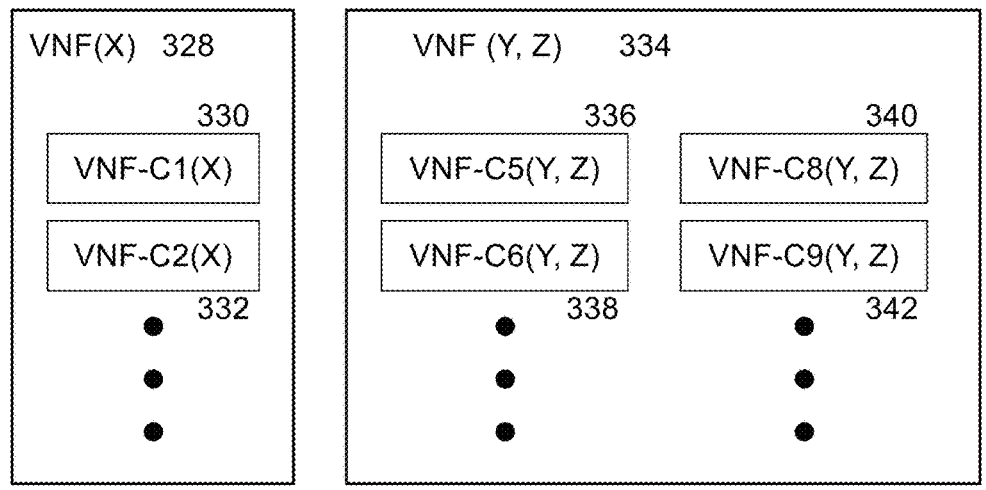
FIG. 3 illustrates a location-aware orchestration model according to an embodiment of the present disclosure.
Figure 3:
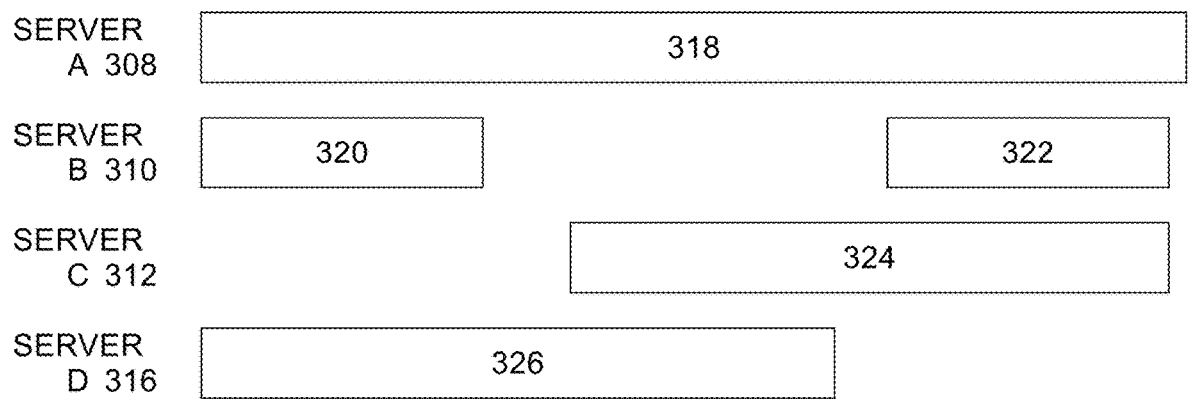
Figure 3:
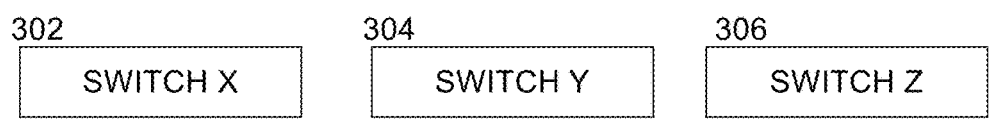

FIG. 3 illustrates a location-aware orchestration model 300 according to an embodiment of the present disclosure. Orchestration for VNF components makes VNF 206 scalable for changing traffic loads. Orchestration can be triggered by reaching a traffic load threshold or by manual intervention by a system administrator. In an embodiment, a location-dependent policy may be used to search for a vacant runtime slot to accommodate a new VNF component. A VNF is location-aware, with a location being a switch. For example, orchestration model 300 may include three switches, such as switch X 302, switch Y 304 and switch Z 306 (in other examples, any number of switches may be used). In this example, there are four servers shown (e.g., representing four or more processors from processor farm 112), including server A 308, server B 310, server C 312, and server D 316. Any server may have connectivity to one or more switches, that is, a server can span several switches (forming a server pool/farm). VNFs and/or constituent VNF components may be executed by any assigned server, depending on server workloads. For example, VNF-C1(X) 330 and VNC-C2(X) 332 of VNF (X) 328 may be assigned to switch X 302, which may be coupled with server A 308 as shown by box 318, server B 310 as shown by box 320, and server D 316 as shown by box 326. For example, VNF-C5(Y, Z) 336 and VNC-C6(Y, Z) 338 of VNF (Y, Z) 334 may be assigned to switch Y 304, which may be coupled with server A 308 as shown by box 318, server C 312 as shown by box 324, and server D 316 as shown by box 326. For example, VNF-C8(Y, Z) 340 and VNC-C9(Y, Z) 342 of VNF (Y, Z) 334 may be assigned to switch Z 306, which may be coupled with server A 308 as shown by box 318, server B 310 as shown by box 322, and server C 312 as shown by box 324.

When a VNF component needs to be instantiated, in an embodiment a server farm (denoted herein as set (all)) may be searched for a server as follows: 1) Select from set (all) a server which satisfies a switch requirement, and join set (a); 2) Select from set (a) a server which satisfies processor/memory/network interface controller (NIC)/storage requirements, and join set (b); or 3) Select from set (b) a server which has the best non-uniform memory access (NUMA) balance status.

Figure 4:
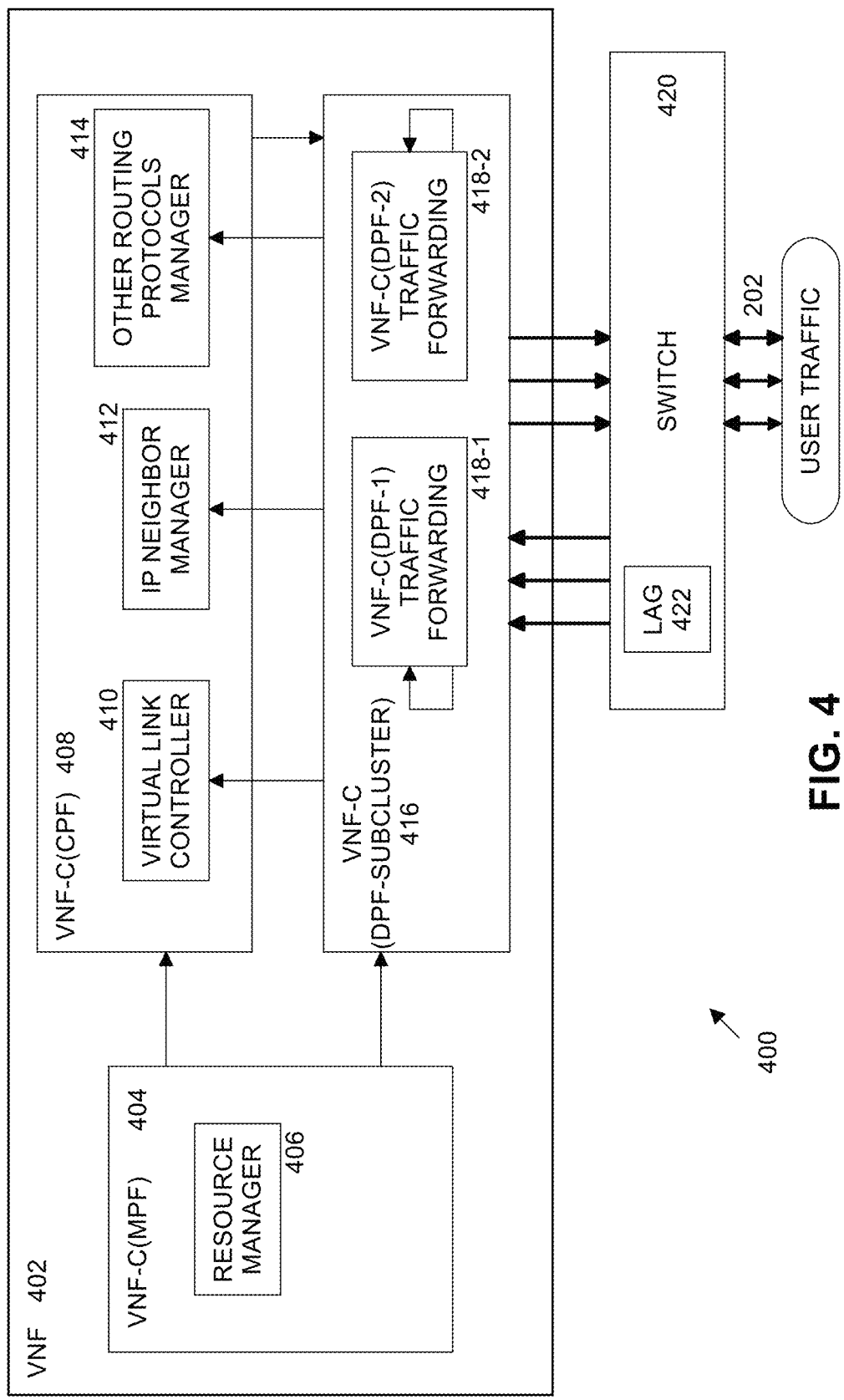
FIG. 4 illustrates a functional view of a VNF in a NFV link-level architecture according to an embodiment of the present disclosure.

FIG. 4 illustrates a functional view of a VNF 402 in a NFV link-level architecture 400 according to an embodiment of the present disclosure. In an embodiment, all VNF components work together as a single logical resource (e.g., users are only able to see one interface to the logical resource). In an embodiment, VNF 402 may be coupled to switch 420 to receive control and/or data packets in user traffic 202 and process the packets. In NFV link-level architecture 400, a VNF component called a Management Plane Function (MPF) (such as VNF-C(MPF) 404) acts as a resource abstraction layer, and the MPF manages the global resources of the NFV link-level architecture 400. In an embodiment, resource manager 406 of VNF-C(MPF) 404 provides management of the logical resources for VNF 402. In an embodiment, these logical resource objects may include, but are not limited to, network interfaces, a virtual local area network (VLAN), addresses, routes, access control list/Internet protocol (ACL/IP) address pools, and policies. Anything uniquely visible to users is managed in the MPF.

Some protocols are processed centrally for the VNF in a VNF component called a Control Plane Function (CPF) (such as VNF-C(CPF) 408). In an embodiment, VNF-C (CPF) 408 includes virtual link controller 410, Internet Protocol (IP) neighbor manager 412, and other routing protocols manager 414. Virtual link controller 410 provides link aggregation control protocol (LACP) virtualization services (which may include the capability to dynamically detect VNF component failures). IP neighbor manager 412 provides management of neighbors according to IPv4 address resolution protocol (ARP) and IPv6 neighbor discovery (ND) virtualization. Other routing protocols manager 414 provides services for other protocols such as border gateway protocol (BGP), open shortest path first (OSPF) protocol, bidirectional forward detection (BFD) protocol, and other protocols.

IP neighbors of the control plane may be handed over to one or more VNF components called Data Plane Functions (DPFs) through reliable channels. A DPF may be used to perform any data plane processing, such as traffic forwarding. Logical resources managed by the MPF are mapped to DPFs, so that every DPF VNF component is able to forward user traffic seamlessly with mapped logical resources. DPFs can be scaled up and down to dynamically adapt to changing user traffic load. VNF 402 may include one or more clusters of one or more DPFs. For example, VNF-C(DPF-subcluster) 416 may include two VNF components for traffic forwarding processing, such as VNF-C(DPF-1) 418-1 and VNF-C(DPF-2) 418-2. In other examples there may be any number of DPF subclusters in a VNF, and any number of DPFs in a subcluster. In an embodiment, a DPF (such as VNF-C(DPF-1) 418-1 or VNF-C(DPF-2) 418-2) may classify a packet received from switch 420 as part of user traffic 202. In an embodiment, control packets of user traffic 202 may be forwarded from a VNF-C(DPF-subcluster) 416 to VNF-C (CPF) 408 and data packets of user traffic 202 may be received by and processed by a DPF within VNF-C(DPF-subcluster) 416.

Link aggregation group (LAG) 422 may be created in switch 420 to distribute user traffic to VNF 402. Specifically, every DPF VNF-C in DPF-subcluster 416 has a physical link attached to LAG 422. Whenever a packet is sent to the LAG 422 by switch 420, through traffic hashing, the packet can go to any DPF. If user traffic is randomly received, the assignment of the sub-link of LAG 422 will also be statistically random.

Figure 5:
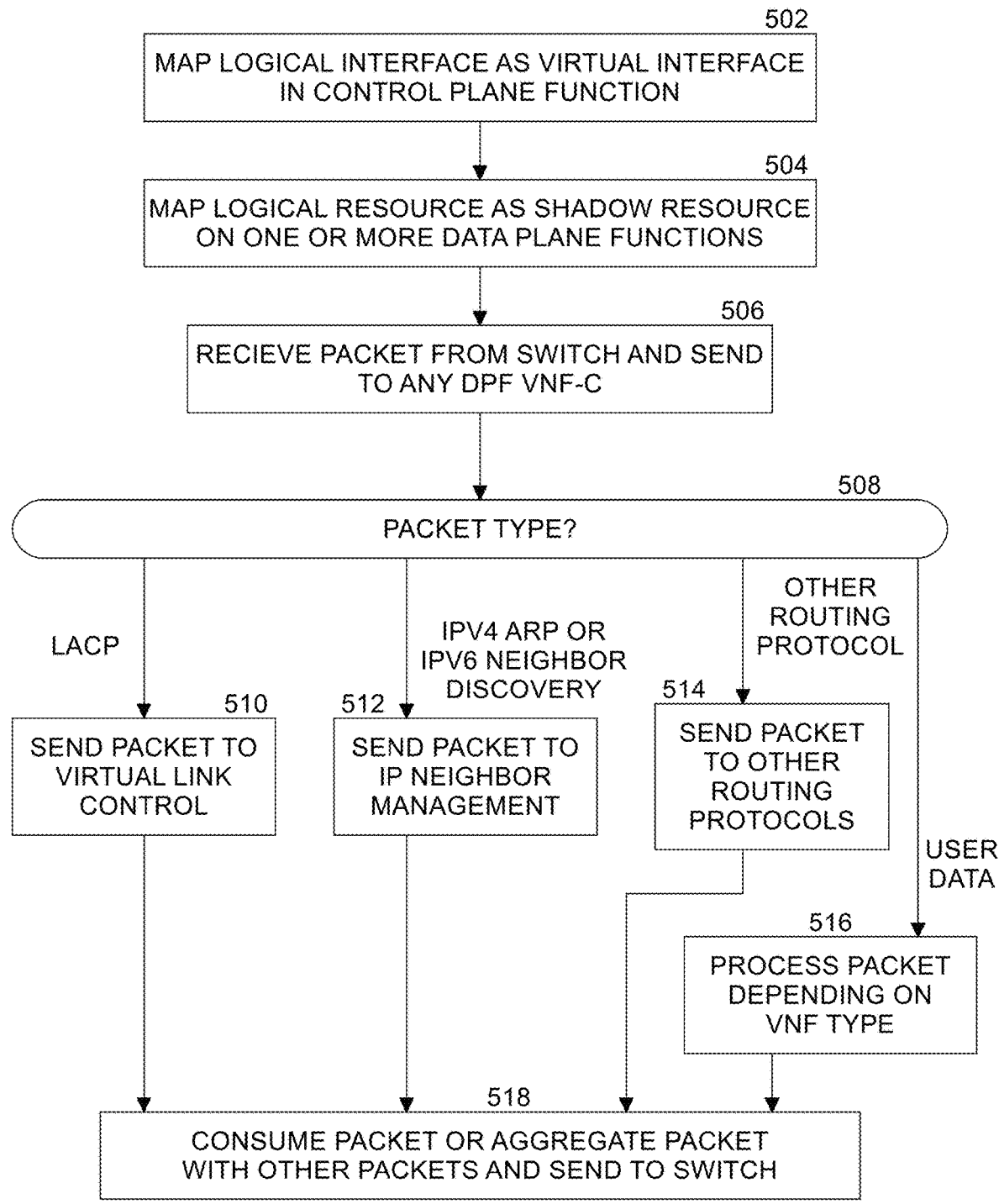
FIG. 5 is a flow diagram illustrating VNF processing according to an embodiment of the present disclosure.

FIG. 5 is a flow diagram illustrating VNF processing 500 according to an embodiment of the present disclosure. At block 502, the MPF of a VNF, such as VNF-C (MPF) 404 of VNF 402, performs virtual link management to map a desired logical interface as a virtual interface in a CPF of the VNF, such as VNF-C(CPF) 408 of VNF 402 (that is, the MPF creates a virtual interface). At block 504, the MPF performs virtual link management to map a desired logical resource as a shadow resource on one or more DPFs of the VNF (e.g., on VNF-C(DPF-1) 418-1 and VNF-C(DPF-2) 418-2) (that is, creates shadow interfaces). In an embodiment, the logical resource is mapped to a shadow resource on every DPF of the VNF. As used herein, a shadow resource is a resource in a DPF supporting a logical resource in the MPF. After the mapping operations, the logical interface of the MPF, the shadow resources of the DPF, and the virtual interface of the CPF form a virtual link.

At block 506, a packet (e.g., part of user traffic 202) is received from switch 420 by VNF 402 over the virtual link and sent to any DPF, such as VNF-C(DPF-1) 418-1 or VNF-C(DPF-2) 418-2. Specifically, LAG 422 is balancing traffic within DPF-subcluster 416. The receiving DPF classifies the packet type of the received packet at block 508. When the packet type indicates LACP, at block 510 the DPF sends the packet to virtual link controller 410 of VNF-C (CPF) 408 for processing to maintain the runtime state of the virtual link identified in the packet. In an embodiment, the virtual link controller 410 manages lifecycles of sub-links from each DPF, and also maintains LACP runtime data for each corresponding sub-link. In an embodiment, to maintain the virtual link in NFV link-level architecture 400, virtual link management provided by the MPF helps set up the static state for a virtual link while virtual link controller 410 of VNF-C(CPF) 408 maintains the runtime (dynamic) state for the virtual link. At block 518, virtual link controller 410 of VNF-C(CPF) 408 may be considered to have consumed the packet and processing of the packet is complete.

When the packet type indicates IPv4 ARP or IPv6 neighbor discovery, at block 512 the DPF sends the packet to IP neighbor manager 412 of VNF-C(CPF) 408 for processing. In an embodiment, the IP neighbor manager 412 retrieves runtime IP adjacency data by analyzing the packet payload, and further constructs an IP adjacency database and maintains the lifecycle of each entry in the IP adjacency database. In an embodiment, IP neighbor manager 412 maintains a link layer address database for IP-based networks and supports handling of traffic in a distributed and virtualized manner. At block 518, IP neighbor manager 412 of VNF-C (CPF) 408 may be considered to have consumed the packet and processing of the packet is complete.

When the packet type indicates other routing protocol, at block 514 the DPF sends the packet to other routing protocols manager 414 of VNF-C(CPF) 408 for processing of the packet. In an embodiment, any individual protocol daemon configured to be running, and by using these packets a protocol daemon may communicate with other protocol peers to exchange information (e.g., BGP is exchanging routes with peers through such packets). In an embodiment, no virtualization is applied to other routing protocols. At block 518, other routing protocols manager 414 of VNF-C (CPF) 408 may be considered to have consumed the packet and processing of the packet is complete.

When the packet type indicates a data packet including user data, the DPF receiving the packet processes the packet at block 516 depending on the VNF type. In an embodiment, a VNF type may be a network function type, such as virtual router (vRouter)/virtual firewall (vFW)/virtual carrier grade network address translation (vCGNAT) which indicates what function the VNF performs. For example, a virtual router (as a VNF) may perform route lookup and forward the packets to next hops; a virtual firewall may inspect the packet and forward or drop the packets after matching the firewall rules; a virtual deep packet inspection (DPI) VNF may inspect the packet and shape the subsequent traffic; and a virtual CGN VNF may translate and rewrite the packet. At block 518, depending on the VNF type, the packet may be considered to have been consumed or the DPF aggregates the packet with other data packets to form aggregated data packets and sends the aggregated data packets to switch 420.

In an embodiment, other data packets may include packets arising from at least two other scenarios. In a first scenario, the VNF may generate some packets from inside a DPF, and these packets to be sent out to users. For example, a transmission control protocol (TCP) reset packet may be generated by a DPF if a TCP session is monitored to be terminated due to rule change in a vFW VNF. In a second scenario, packets may be generated by CPF 408 as a result of protocol negation. For example, an ARP-request packet is generated periodically by IP neighbor manager 412 to confirm an IP neighbor is alive.

Blocks 506-518 may be performed for every packet in user traffic 202 received by switch 420. In an embodiment, VNF-C(CPF) 408 is not able to forward traffic directly to the switch 420 and then on to users in user traffic 202. Instead, VNF-C(CPF) 408 must forward packets to a designated DPF. In an embodiment, the transmission channel between the CPF and a DPF may be reliable or unreliable.

While in the context of the example described with reference to the flow diagrams of FIG. 5, a number of enumerated blocks are included, it is to be understood that examples may include additional blocks before, after, and/or in between the enumerated blocks. Similarly, in some examples, one or more of the enumerated blocks may be omitted and/or performed in a different order.

Figure 6:
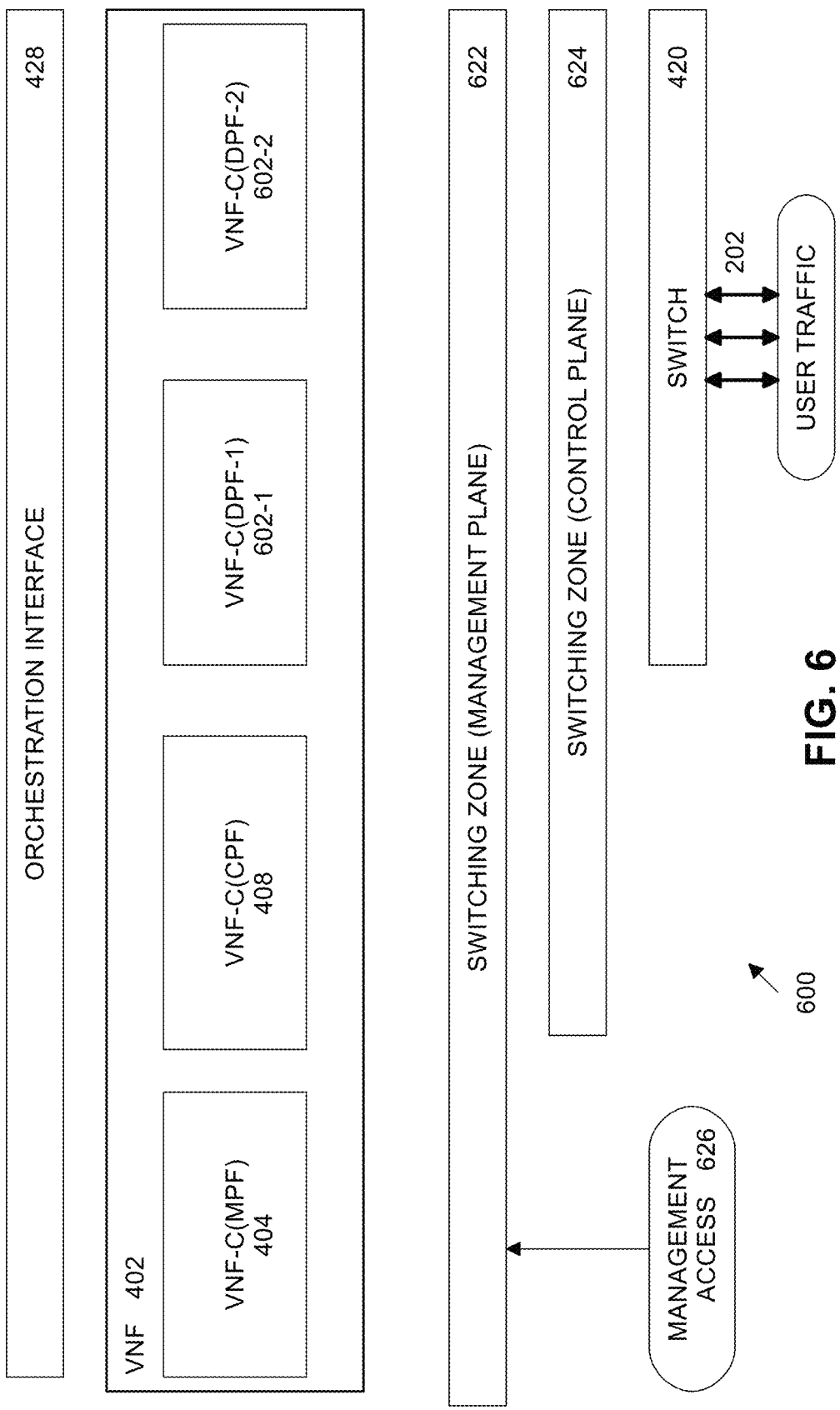
FIG. 6 illustrates a placement view of VNF components according to an embodiment of the present disclosure.

FIG. 6 illustrates a placement view 600 of VNF components according to an embodiment of the present disclosure. Orchestration interface 428 is provided to users to interact with VNF 402. Management access 626 (e.g., by a system administrator) may be through a switching zone (management plane) 622 to VNF-C(MPF) 404. As mentioned above in the description of the orchestration model of FIG. 3, VNF 402 is location-aware in NFV link-level architecture 400 and there may be placement requirements for VNF-components. In an embodiment, all DPF VNF components (such as VNF-C(DPF-1) 602-1 and VNF-C(DPF-2) 602-2) must be attached to the same data plane switch 420. In an embodiment, all DPF VNF components and CPF VNF components must be attached to switches which have direct Layer2 connectivity with or without VLAN segregation for control plane traffic (in switching zone (control plane) 624). All DPF, CPF and MPF VNF components must be attached to switches which have Layer3(IP) connectivity for management traffic communication. Control plane traffic is usually hidden from users and the operator/administrator, and control plane traffic is usually segregated from data plane traffic for security reasons. This deters users from being able to inject malicious control traffic, which will impact VNF functional behavior.

Figure 7:
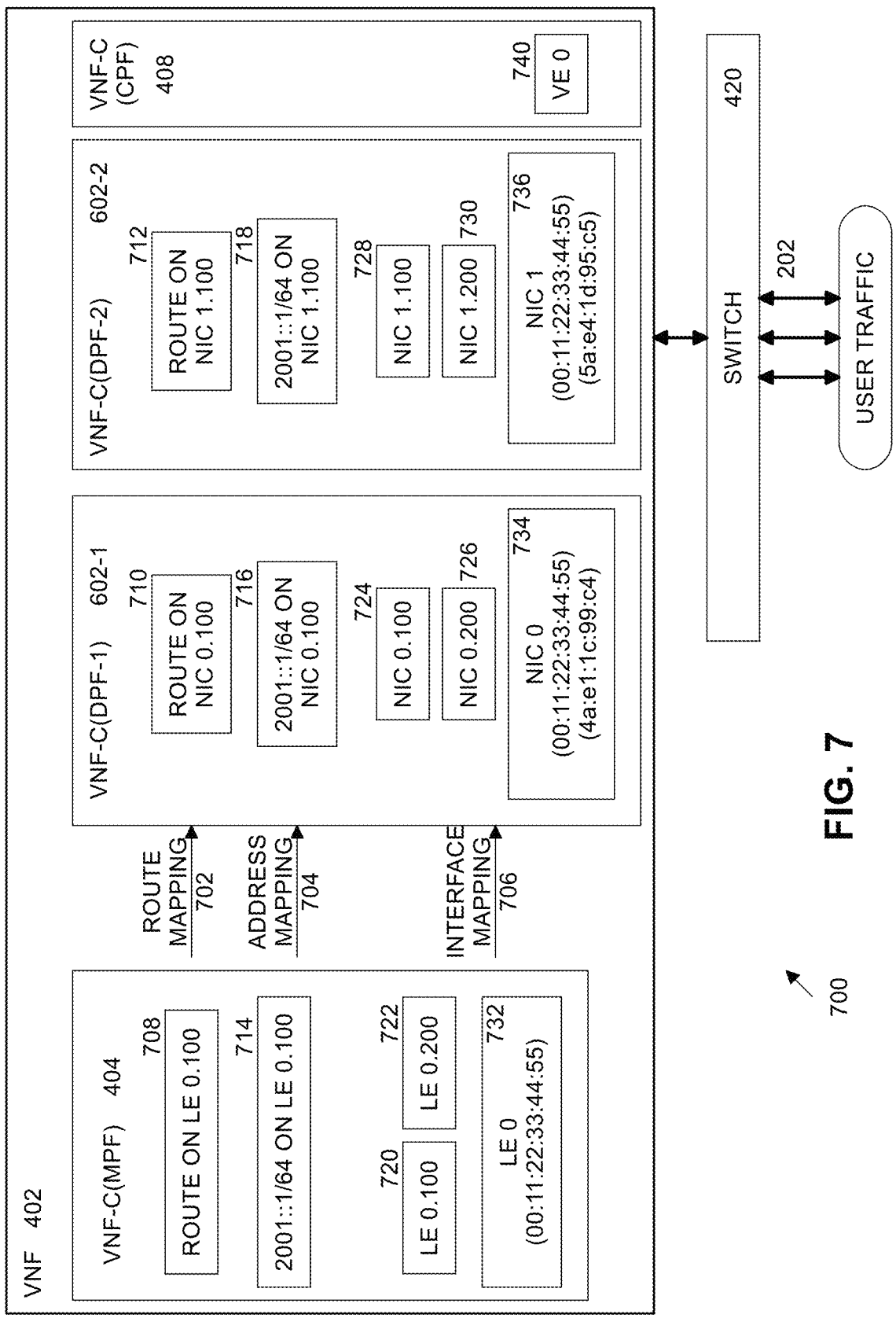
FIG. 7 illustrates a resource mapping model according to an embodiment of the present disclosure.

As used herein, mapping in virtual link management (e.g., logical resource mapping) results from a logical resource object being applied to the DPF/CPF. The logical resource is not configured directly to a DPF. Instead, a one to many logical to physical mapping is configured. FIG. 7 illustrates a resource mapping model 700 according to an embodiment of the present disclosure. For interface mapping 706 for a DPF (e.g., VNF-C(DPF-1) 602-1 or VNF-C(DPF-2) 602-2) in VNF 402, a Logical Ethernet (LE) interface (e.g., LE 0 732) is mapped in a DPF instantiation phase by performing the following actions. The switch 420 to which the LE interface is attached is examined by the DPF, with any local interface (a local interface is a physical presence, and physically receives and transmits packets) (e.g., NIC 0 734 or NIC 1 736) within the same switch being chosen. The MAC address (e.g., 00:11:22:33:44:55) of the LE interface (e.g., LE 0 732) is added as a secondary MAC address (e.g., NIC 0 734 or NIC 1 736) of the local interface, enabling a promiscuous mode for the local interface if the local interface doesn't support a secondary MAC address. For some NICs that do not support secondary MAC addresses, the way to receive packets with a non-device-built-in address as a destination MAC address is to enable promiscuous mode for this NIC. The maximum transmission unit (MTU) of the local interface (e.g., NIC 0 734 or NIC 1 736) is set to the value of the LE interface (e.g., LE 0 732). Sub VLAN interfaces are created if there are any logical sub VLAN interfaces present. For example, interface 720 is mapped as interface 724 in VNF-C(DPF-1) 602-1, interface 722 is mapped as interface 726 in VNF-C(DPF-1) 602-1, interface 720 is mapped as interface 728 in VNF-C(DPF-2) 602-2, and interface 722 is mapped as interface 730 in VNF-C(DPF-2) 602-2. Address mapping 704 is performed by applying the IPv4 and/or IPv6 addresses of LE interface to the local interface without changes. Route mapping 702 is performed to synchronize any routes to all DPFs without loss. Routes may be generated by dynamic routing protocols and policies. A logical route is translated in DPF and applied. For example, "route on LE 0.100" 708 may be interpreted by VNF-C(DPF-1) 602-1 and applied as "route on NIC 0.100" 710 while "route on LE 0.100" 708 may be interpreted by VNF-C(DPF-2) 602-2 and applied as "route on NIC 1.100" 712. For other resources, any network function specific resources such as policies, IP pools, virtual IPs (VIPs), and access control lists (ACLs) may also be mapped to all DPFs with or without interpretation. For interface mapping for a CPF, the LE interface (e.g., LE 0 732) is directly mirrored to the CPF as a virtual ethernet interface (VE ID). VE 0 740 is created in CPF 408, and the virtual interface is used by virtual link controller 410, IP neighbor manager 412, and other protocol manager 414.

Figure 8:
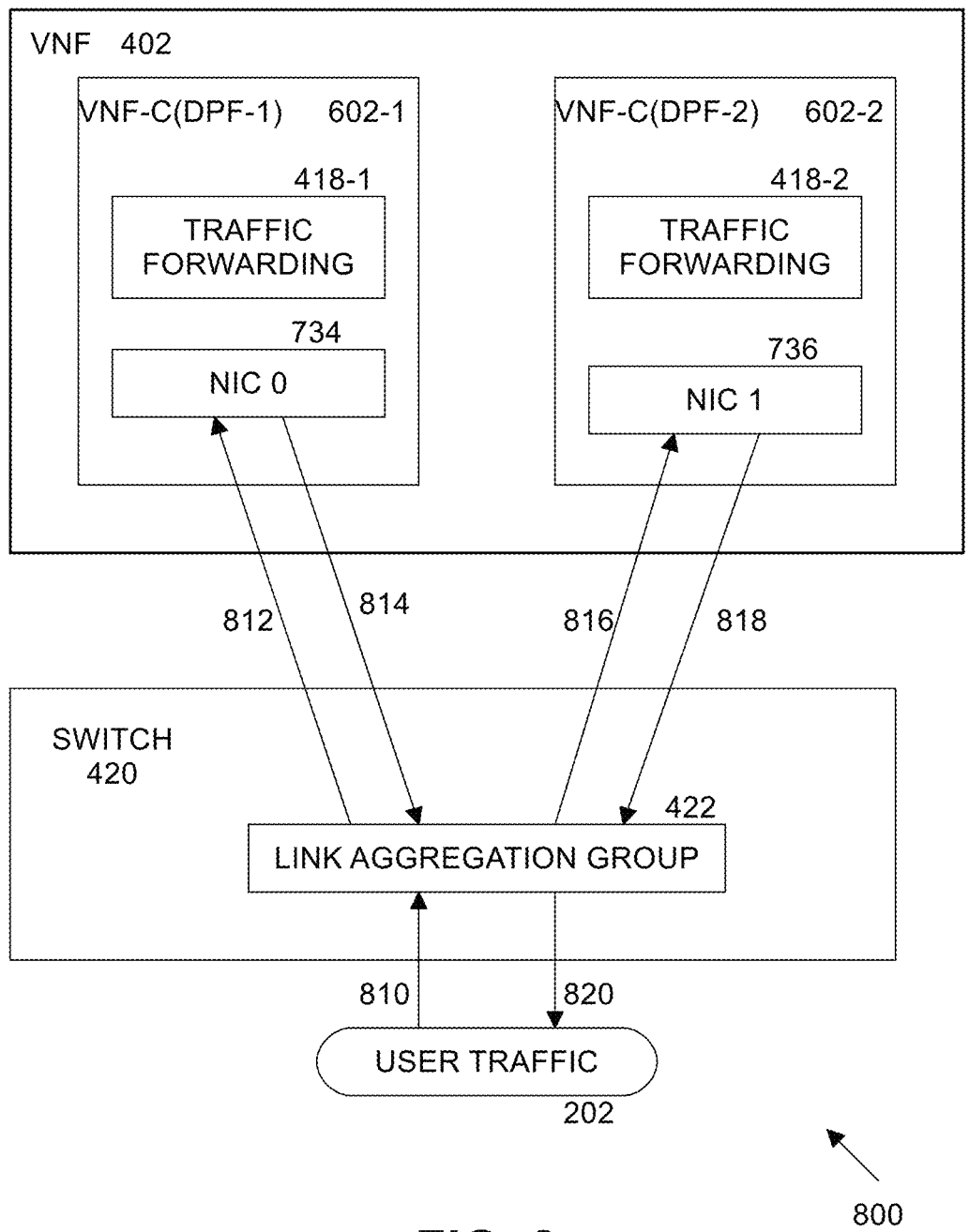
FIG. 8 illustrates intra-switch zone traffic forwarding processing according to an embodiment of the present disclosure.

FIG. 8 illustrates intra-switch zone traffic forwarding 800 processing according to an embodiment of the present disclosure. A VNF 402 component DPF (e.g., VNF-C(DPF-1) 602-1 or VNF-C(DPF-2) 602-2) is responsible for forwarding user traffic (e.g., using traffic forwarding 418-1, 418-2, respectively). Switches act as user-premise devices. For example, for VNF-attached switch 420, southbound ports are connected to other network functions (e.g., to receive user traffic 202) and northbound ports are aggregated together to forward traffic to and from a VNF component DPF. The traffic load can be balanced among DPFs due to link aggregation group (LAG) 422 flow hash-based port selection being performed in switch 420. A VNF can join more than one switching zone, if necessary. A switching zone in a data plane is typically an Ethernet switch providing a single link aggregation group (LAG) to the VNF. In an embodiment, intra switching zone VNF traffic forwarding may be implemented as follows. User traffic 202 is received (arrow 810) by switch 420, through MAC-address/VLAN based Layer2 forwarding and the output local interface is decided as LAG 422. When LAG 422 receives the traffic, LAG computes the hash value of the packet, and decides to which active member link to send the packet. Statistically, the packet can go to any arbitrary member link, thus reaching any arbitrary VNF component DPF. For example, switch 420 may send the packet to NIC 0 734 in VNF-C (DPF-1) 602-1 (arrow 812) or to NIC 1 736 in VNF-C(DPF-2) 602-2 (arrow 816). The receiving VNC-c DPF processes the packet and sends the packet through a local interface (arrow 814 or arrow 818, for VNF-C(DPF-1) 602-1 or VNF-C(DPF-2) 602-2, respectively), if necessary. Any packet sent over a VNF component DPF local interface will be received by LAG 422. The packet is processed by switch 420 using MAC-address/VLAN based layer2 forwarding, then is sent out (arrow 820) from this switching zone (e.g., switch 420).

Figure 9:
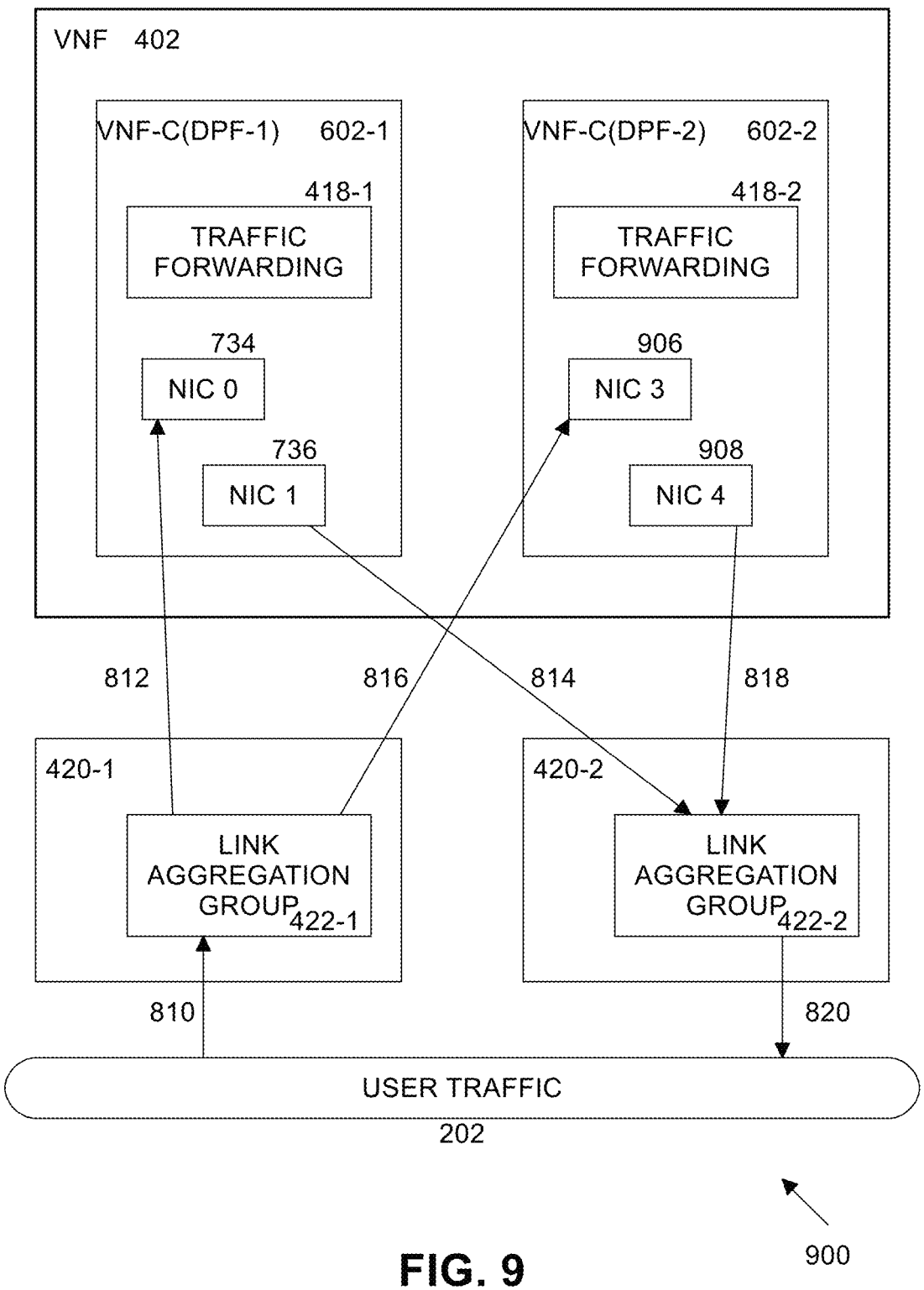
FIG. 9 illustrates inter-switch zone traffic forwarding processing according to an embodiment of the present disclosure.

FIG. 9 illustrates inter-switch zone traffic forwarding 900 processing according to an embodiment of the present disclosure. An inter-switching zone VNF is able to receive traffic from one switch and forward the traffic into another switch. Processing for inter-switch zone traffic is similar to processing for intra-switch zone traffic described above with respect to FIG. 8, except for performance of the forwarding decision by the VNF component DPF. For example, a packet in user traffic 202 may be received from link aggregation group 422-1 in switch 420-1 by NIC 0 734 of VNF-C(DPF-1) 602-1 (arrow 812), processed by traffic forwarding 418-1, and forwarded by NIC 1 736 to link aggregation group 422-2 in switch 420-2 (arrow 816). Similarly, a packet in user traffic 202 may be received from link aggregation group 422-1 in switch 420-1 by NIC 3 906 of VNF-C(DPF-2) 602-2 (arrow 816), processed by traffic forwarding 418-2, and forwarded by NIC 4 908 to link aggregation group 422-2 in switch 420-2 (arrow 818). Thus, traffic forwarding between VNF component DPFs and switches is supported.

Figure 10:
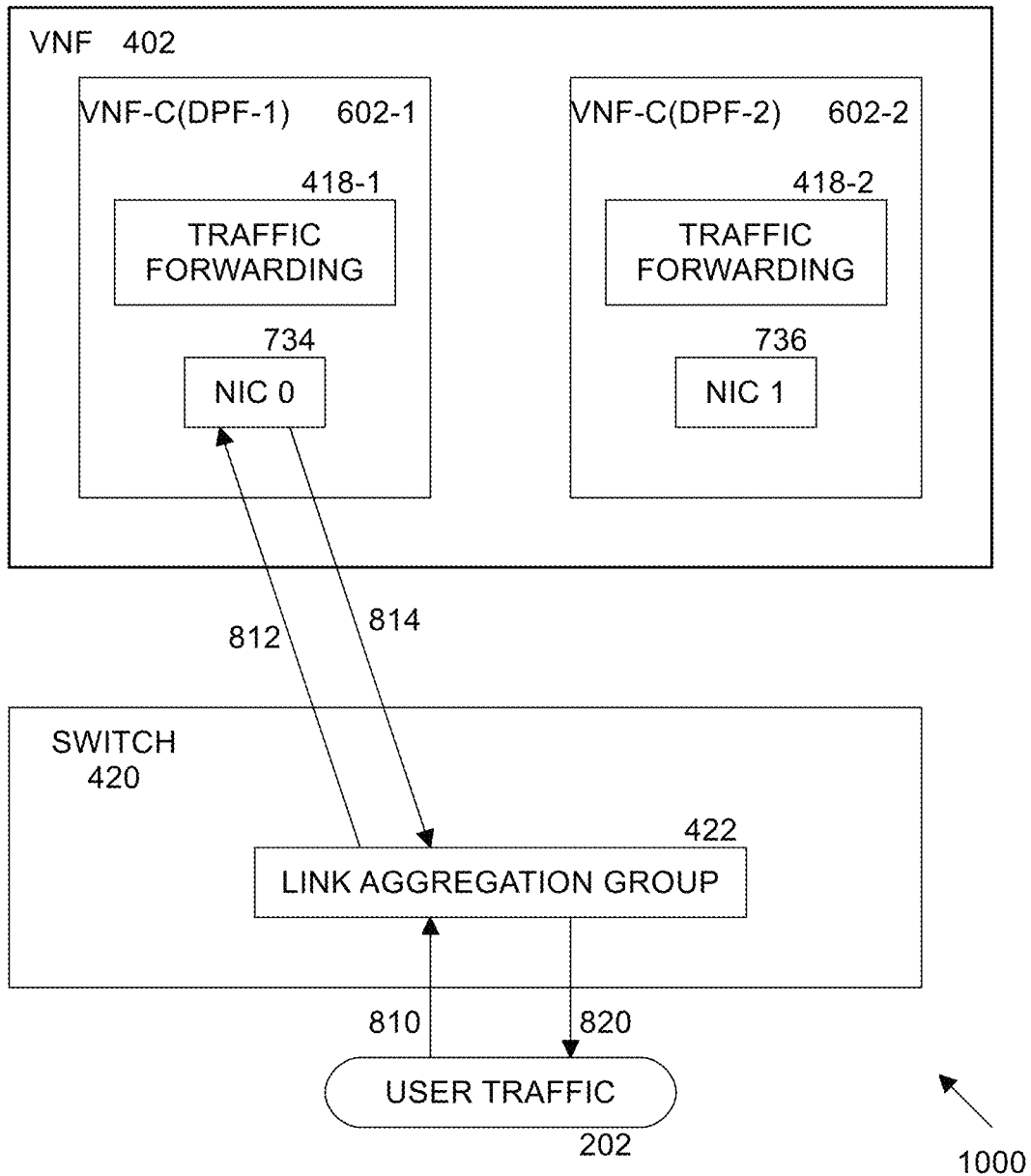
FIG. 10 illustrates traffic migration for data plane function (DPF) VNF component scaling down according to an embodiment of the present disclosure.

FIG. 10 illustrates traffic migration for data plane function (DPF) VNF component scaling down 1000 according to an embodiment of the present disclosure. In the case of VNF-c DPF scaling down, the traffic of a decommissioned DPF will be distributed to other DPF nodes by switch 420, the traffic will not be dropped, and high availability is naturally guaranteed in the present NFV link-level architecture 400. For example, assume that VNF-C(DPF-2) 602-2 is decommissioned. The physical link of VNF-C(DPF-2) 602-2 is removed from a list of active member links in LAG 422 of switch 420 (e.g., MPF performs partial un-mapping of the virtual link as a result of energy-saving scaling-down). Switch 420 receives user traffic 202 as before. The user traffic which was previously processed by decommissioned DPF node VNF-C(DPF-2) 602-2 now will be forwarded to a newly selected DPF, such as VNF-C(DPF-1) 602-1 (or other DPF). Hence the user traffic is now going to be processed by the newly selected DPF. That is, the decommissioned DPF is now unmapped. The newly selected DPF returns the processed traffic to switch 420.

Figure 11:
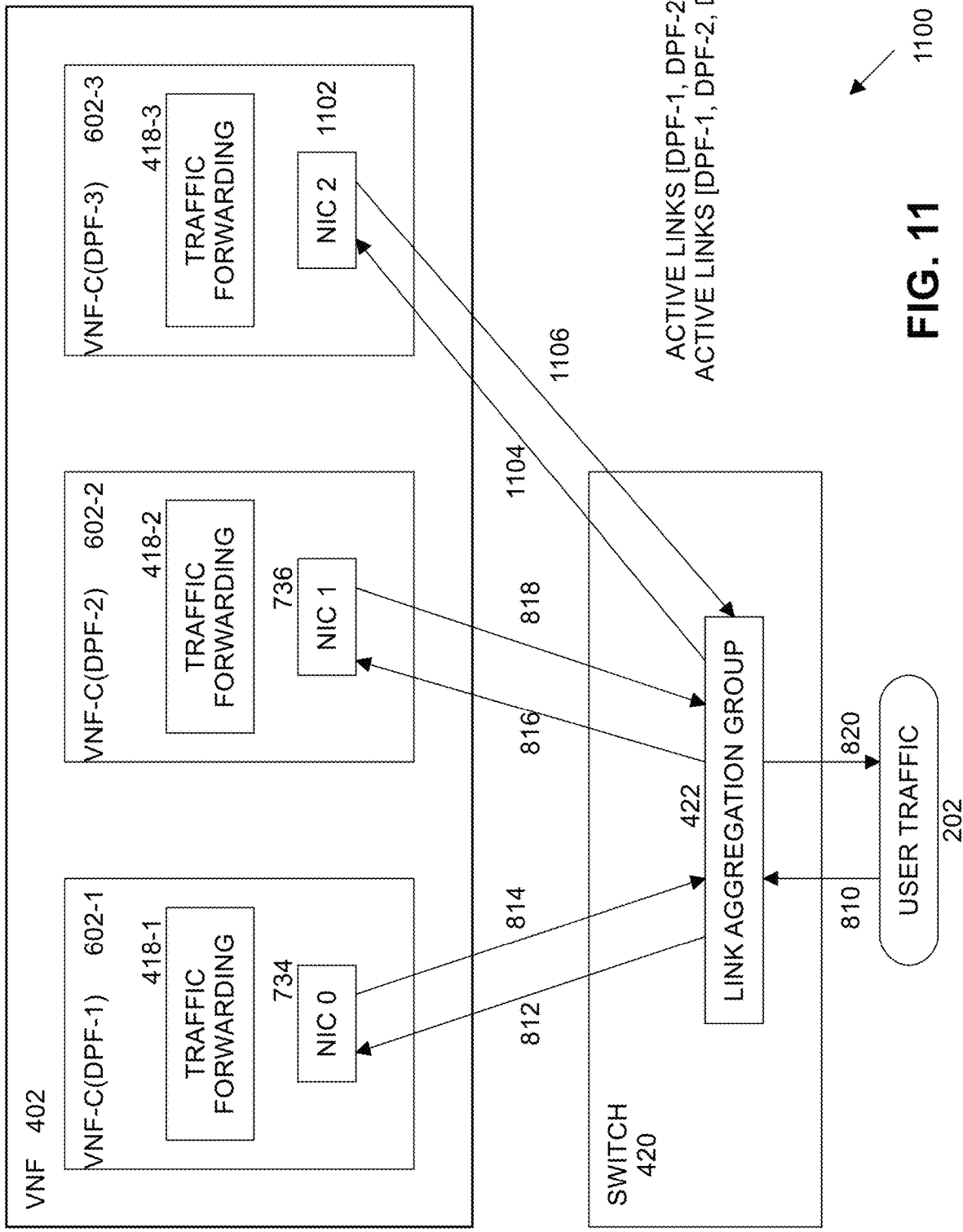
FIG. 11 illustrates traffic migration for DPF VNF component scaling up according to an embodiment of the present disclosure.

FIG. 11 illustrates traffic migration for data plane function (DPF) VNF component scaling up 1100 according to an embodiment of the present disclosure. When a new VNF component DPF (e.g., VNF-C(DPF-3) 602-3 joins, traffic will also go through another migration as follows. The physical link of a newly joined DPF (e.g., VNF-C(DPF-3) 602-3) becomes an active member of LAG 422 in switch 420. Switch 420 receives user traffic as before. Paths for all traffic flows will be re-selected by switch 420, which means existing traffic paths may be changed. Because the new DPF has been added, traffic may be forwarded to any one of VNF-C(DPF-1) 602-1 (arrow 812), VNF-C(DPF-2) 602-2 (arrow 816), and/or VNF-C(DPF-3) 602-3 (arrow 1104). Each VNF component DPF processes traffic (included newly added VNF-C(DPF-3) 602-3). Traffic is sent out from the local interface of the DPF to switch 420 (including traffic from newly added VNF-C(DPF-3) 602-3 (arrow 1106)) and then the switch sends the traffic out (arrow 820). Thus, this action adds, by the MPF, another DPF and associated virtual link to a link aggregation group including the virtual link of the existing DPFs for the logical resource.

This scaling up scenario has a drawback in that all traffic paths will be impacted.

The present NFV link-level architecture 400 enables scaling of processing of NFV applications while running traffic on-the-fly, users can decommission DPFs in off-peak times when user traffic load is decreased, and users can add more DPF nodes to accommodate increasing traffic. Through scaling, users are also able to recycle servers and reuse them for other applications. Thus, users are able to pool their servers to save costs in computing environment 100.

Figure 12:
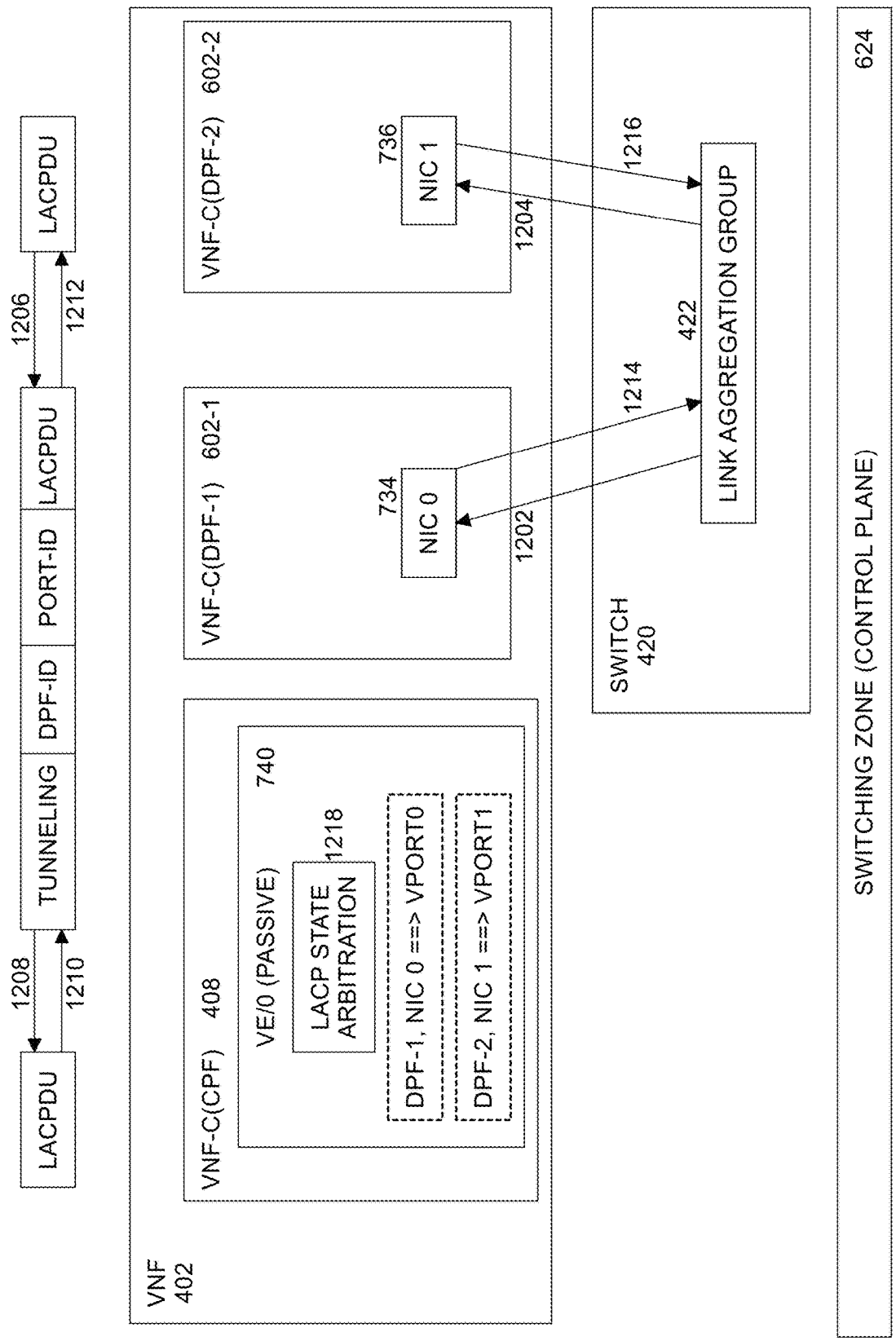
FIG. 12 illustrates link aggregation control protocol (LACP) virtualization according to an embodiment of the present disclosure.

FIG. 12 illustrates link aggregation control protocol (LACP) virtualization 1200 according to an embodiment of the present disclosure. In a virtualized environment, switch 420 might not be able to detect a link failure, so LACP (in virtual link controller 410 of VNF-C (CPF) 408) must quickly detect link status changes. An example failure is when a computing system is halted and the link physical status is up, with a static LAG configuration switch 420 may operate as if the link peer is still alive. Link state negotiation is done via a LACP Data Unit (LACPDU) Ethernet frame. Switch 420 works in active mode and actively generates LACPDU frames and sends the LACPDU frames to link peers. In this case, the link peers are VNF component DPFs. In an embodiment, LACPDU is virtualized in the CPF (e.g., VNF-C(CPF) 408). Every logical interface (LE) has a mapped interface in a CPF virtual Ethernet interface (VE/0) 740, the mapped interface type in the CPF is a bond Ethernet interface. However, no physical interfaces are attached to the bonding interface. Some dynamically created virtual interfaces may be attached and these interfaces are 1:1 mapped to each physical interface of DPFs.

In an embodiment, LACP processing in the present NFV link-level architecture may be performed as follows. Switch 420 produces an LACPDU as a result of LAG 422 setup and a "keepalive" mechanism. The LACPDU is sent out on the physical link and received by every connected VNF component DPF (e.g., VNF-C(DPF-1) 602-1 and VNF-C(DPF-2) 602-2, arrows 1202 and 1204, respectively). A DPF does not do any protocol processing upon receiving a LACPDU, instead the DPF sends the LACPDU to the CPF (e.g., VNF-C(CPF) 408). Specifically, a DPF encapsulates the LACPDU within any tunnel along with an identifier (ID) of the DPF and a Port ID (arrow 1206). The tunnel provides connectivity to the CPF, and once the CPF receives the encapsulated LACPDU, the CPF decapsulates and extracts the original LACPDU along with DPF ID and Port ID (arrow 1208). The CPF searches for a tuple <DPF ID, Port ID> for the sub-virtual interface (vport X) in an internal database and creates a new tuple if the lookup fails. The CPF associates the sub-virtual interface (vport X) with the received LACPDU. LACP state arbitration 1218 processes the LACPDU. In some scenarios, LACP arbitration 1218 creates a new LACPDU that needs to be sent back to switch 420. For example, the virtual ethernet interface VX/0 420 is working in passive LACP mode, and once the VX/0 receives a LACPDU, the VX/0 responds and sends an LACPDU back to the peer of LAG in switch 420 (which works in active mode). CPF encapsulates the newly produced LACPDU with tunneling (arrow 1210). The CPF sends the LACPDU to the originating DPF. The DPF decapsulates the encapsulated LACPDU, extracts the DPF ID and Port ID (arrow 1212), and discards the LACPDU if the extracted DPF ID doesn't match the local DPF ID of the DPF. The DPF sends the LACPDU to the interface matching the extracted Port ID to LAG 422 in switch 420 (arrows 1214, 1216 for VNF-C (DPF-1) 602-1 and VNF-C(DPF-2) 602-2, respectively. The tunnel used here is an unreliable tunnel. In an embodiment, for improved performance LACPDU over user datagram protocol (UDP) encapsulation tunneling may be used.

Figure 13:
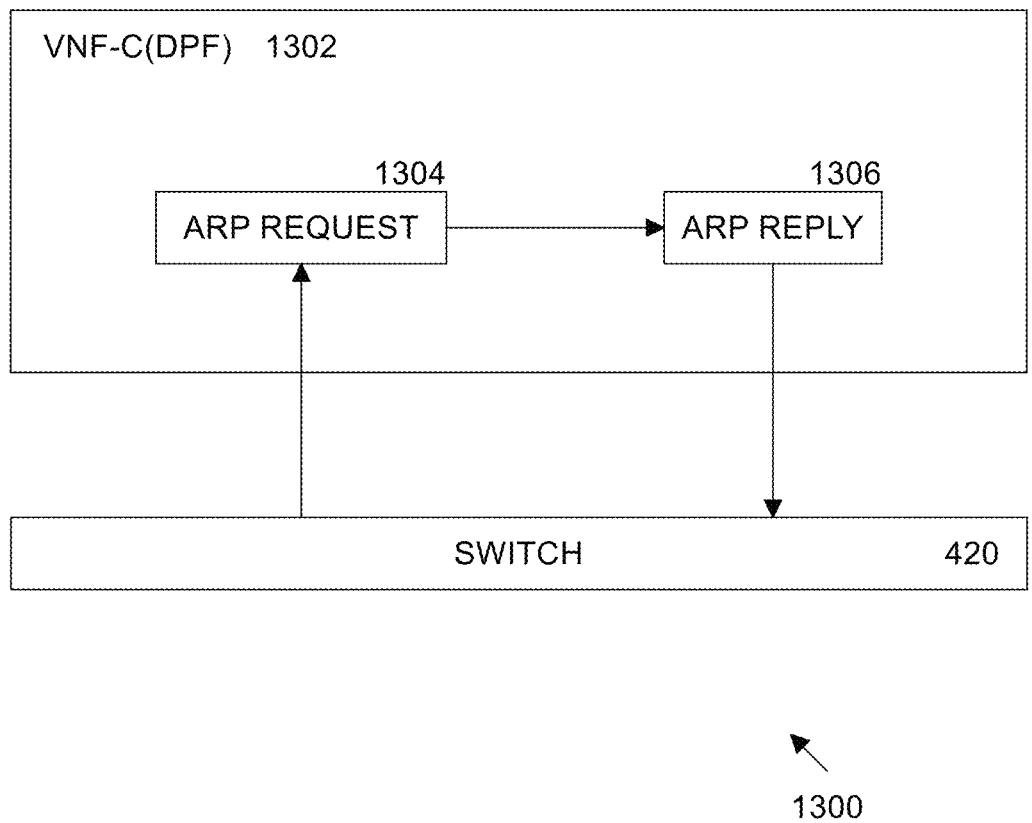
FIG. 13 illustrates address resolution protocol (ARP) resolution for a packet originating from an external network according to an embodiment of the present disclosure.

FIG. 13 illustrates address resolution protocol (ARP) resolution for a packet originating from an external network 1300 according to an embodiment of the present disclosure. Every DPF has the same interface MAC addresses and IP addresses. When an ARP request packet 1304 arrives at any one of the DPFs (e.g., VNF-C(DPF) 1302 from outside networks, the DPF generates and sends an ARP reply packet 1306 as follows. First, the DPF receives the ARP request packet 1304, and forwards the ARP request packet to a local protocol stack (not shown in FIG. 13). The local protocol stack generates ARP reply packet 1306 if the local protocol stack is able to respond to the request. If so, the generated ARP reply packet 1306 is sent back to switch 420.

Figure 14:
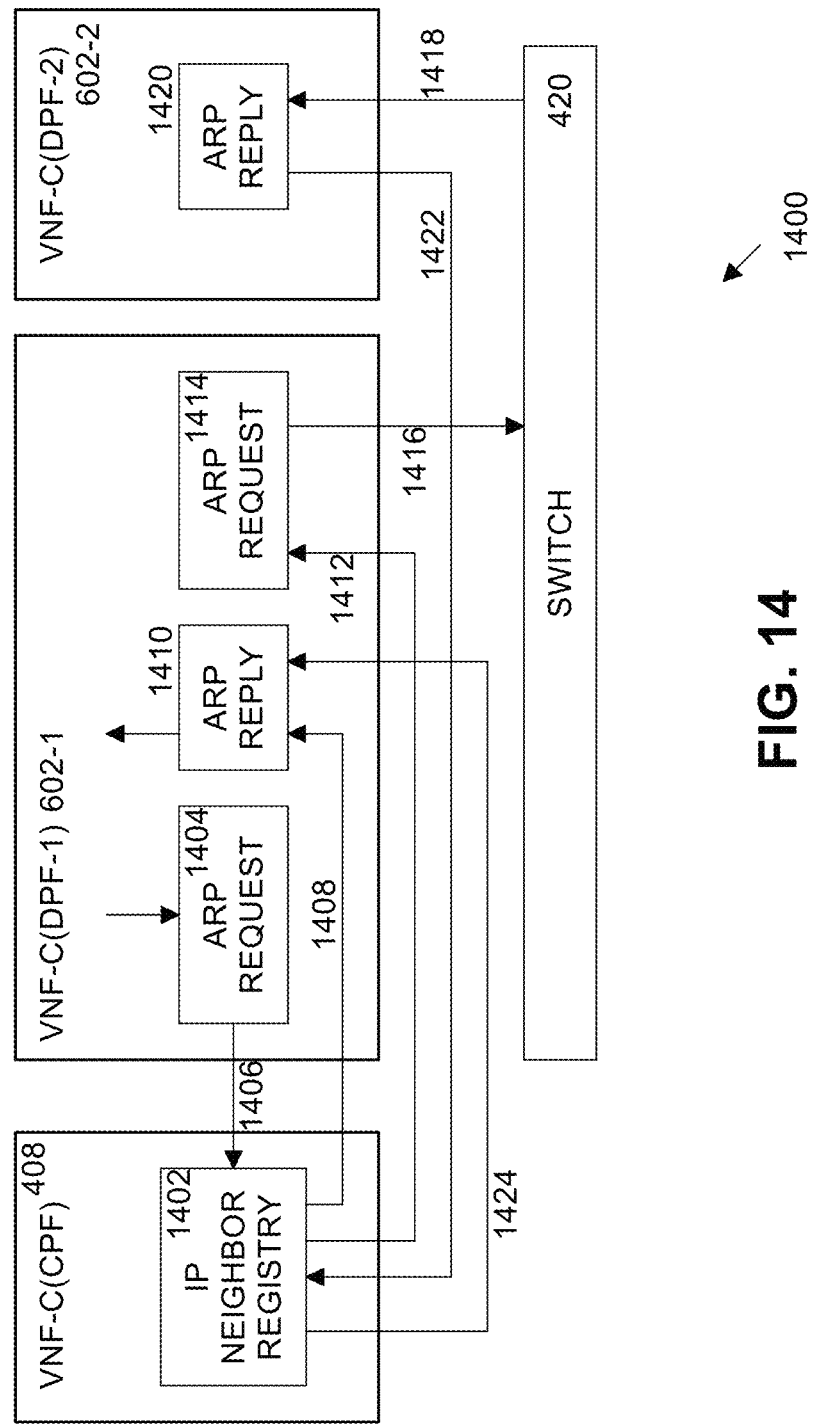
FIG. 14 illustrates ARP resolution for a packet originating from a DPF VNF component according to an embodiment of the present disclosure.

FIG. 14 illustrates address resolution protocol (ARP) resolution for a packet originating from a DPF VNF component 1400 according to an embodiment of the present disclosure. The situation for the case where one VNF component DPF initiates an ARP request packet 1404 is complicated because the ARP reply packet 1410 may not return to the originating DPF because of unpredictable switch LAG port selection processes. When a VNF component DPF (such as VNF-C(DPF-1) 602-1) wants to search an IP neighbor through ARP request packet 1404, VNF-C(DPF-1) 602-1 does not immediately send the ARP request packet to switch 420. Instead, VNF-C(DPF-1) 602-1 sends ARP request packet 1404 (arrow 1406) to IP neighbor registry 1402 in VNF-C(CPF) 408 for further processing. IP neighbor registry 1402, which manages IP neighbors centrally for the VNF, performs a search for the IP neighbor contained in the ARP request 1404. If a valid IP neighbor is found during the search, VNF-C(CPF) 408 generates an ARP reply packet 1410 containing the IP neighbor information and sends the ARP reply packet to VNF-C(DPF-1) 602-1 (arrow 1408). VNF-C(DPF-1) 602-1 receives the ARP reply packet 1410 and processes the ARP reply in the local protocol stack.

If no valid IP neighbor is found, IP neighbor registry 1402 tries to search for a valid IP neighbor in an outside network. VNF-C(CPF) 408 has no access to data plane networks, so VNF-C(CPF) 408 sends an ARP request packet 1414 back to the requesting DPF (e.g., VNF-C(DPF-1) 602-1) (arrow 1412). VNF-C(DPF-1) 602-1 receives ARP request packet 1414 from the CPF. VNF-C(DPF-1) 602-1 does not process ARP request packet 1414 in the local protocol stack, but instead sends the ARP request packet to an outside network via switch 420 (arrow 1416). The ARP reply packet 1420 can be received by any VNF-c DPF (for example, VNF-C (DPF-2) 602-2 (arrow 1418). ARP reply packet 1420 is sent to the CPF (arrow 1422), so that the IP neighbor in IP neighbor registry 1402 will be completed. If the outgoing ARP request packet 1414 is associated with the IP neighbor (e.g., in this case VNF-C(DPF-1) 602-1), IP neighbor registry 1402 generates an ARP reply packet 1410 containing the IP neighbor information and sends the ARP reply packet back to requesting DPF (arrow 1424). The ARP resolution process terminates after the ARP reply packet is processed in a local protocol in the DPF.

In an embodiment, IP neighbor registry 1402 maintains a table with the following format.

| vlan100 | LE 0 | 10.0.0.2  | 00:00:00:00:00:00 | requestor: dpf0 | incomplete |
| vlan100 | LE 0 | 10.0.0.3  | 00:00:00:00:00:00 | requestor: dpf1 | incomplete |
| vlan200 | LE 0 | 1.1.1.130 | 00:00:00:00:00:00 | requestor: dpf1 | incomplete |

When an initial ARP request packet arrives at IP neighbor registry 1402, if the IP neighbor entry is not found, a new incomplete entry is created to track the IP neighbor. If the neighbor entry is found complete, IP neighbor registry 1402 sends the ARP reply packet back directly to the requestor.

| vlan100 | LE 0 | 10.0.0.2  | 52:54:00:11:90:88 | N/A | complete |
| vlan100 | LE 0 | 10.0.0.3  | 52:54:00:11:90:89 | N/A | complete |
| vlan200 | LE 0 | 1.1.1.130 | 52:54:00:11:90:8a | N/A | complete |

Whenever the found IP neighbor entry is incomplete, IP neighbor registry 1402 sends the ARP request packet back to the requesting DPF, and the requesting DPF continues to send the ARP request packet. The ARP reply packet might be received by DPFs other than the requesting DPF node. Whenever a DPF receives ARP reply packets from outside networks, the DPF sends the ARP reply packet 1420 to IP neighbor registry 1402, the IP neighbor registry makes the entry complete, and generates and sends the ARP reply packet back to requestor. If there are multiple requestors requesting the same IP address, the latest requestor is recorded. This process tolerates packet loss, and every DPF can eventually obtain a desired IP neighbor.

Embodiments of the present disclosure include various steps, which have been described above. The steps may be performed by hardware components or may be embodied in machine-executable instructions, which may be used to cause one or more processing resources (e.g., one or more general-purpose and/or special-purpose processors) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or general-purpose computer hardware to execute the code contained therein. An apparatus for practicing various embodiments of the present disclosure may involve one or more computer systems (e.g., physical and/or virtual servers, physical and/or virtual network security appliances) (or one or more processors within a single computer system) and storage systems containing or having network access to computer program(s) coded in accordance with various methods described herein, and the method steps associated with embodiments of the present disclosure may be accomplished by modules, routines, subroutines, or subparts of a computer program product.

Figure 15:
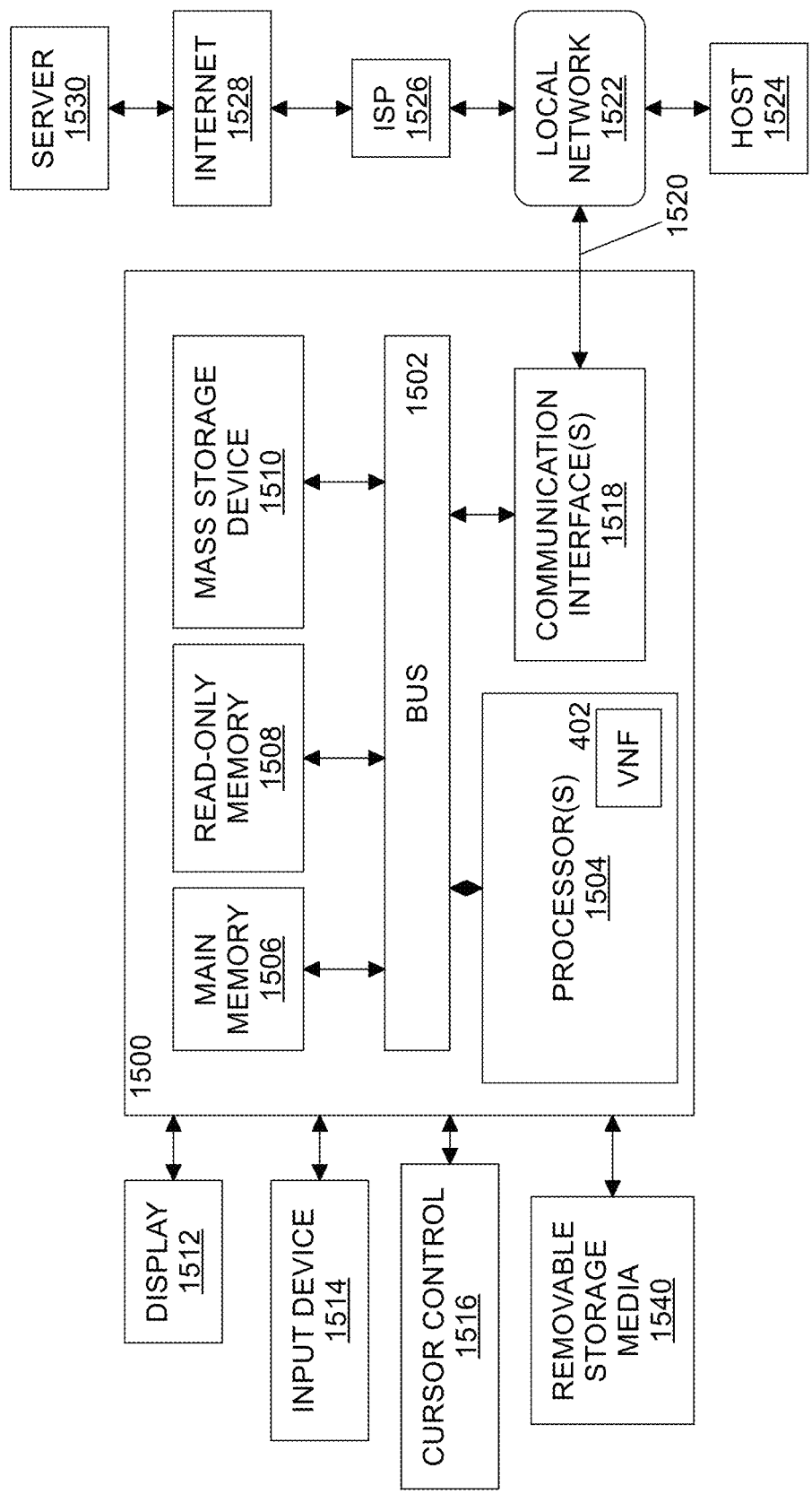
FIG. 15 illustrates an example computing system in which or with which embodiments of the present disclosure may be utilized.

FIG. 15 is a block diagram that illustrates a computing system 1500 in which or with which an embodiment of the present disclosure may be implemented. Computing system 1500 may be representative of a computer server on which a VNF 402 is running. Notably, components of computing system 1500 described herein are meant only to exemplify various possibilities. In no way should the example computing system 1500 limit the scope of the present disclosure. In the context of the present example, computing system 1500 includes a bus 1502 or other communication mechanism for communicating information, and one or more processing resources (e.g., one or more hardware processors 1504) coupled with bus 1502 for processing information. Hardware processors 1504 may include, for example, one or more general purpose microprocessors available from one or more current or future microprocessor manufactures (e.g., Intel Corporation, Advanced Micro Devices, Inc., and/or the like) and/or one or more special purpose processors (e.g., graphics processing units (GPUs), network processors (NPs), and/or accelerators or co-processors). In some examples, one or more processing resources may be part of an application specific integrated circuit (ASIC)-based security processing unit (e.g., the FORTISP family of security processing units available from Fortinet, Inc. of Sunnyvale, CA).

Computing system 1500 also includes a main memory 1506, such as a machine readable random-access memory (RAM) or other dynamic storage device, coupled to bus 1502 for storing information and instructions (e.g., VNF 402) to be executed by processor(s) 1504. Main memory 1506 also may be used for storing temporary variables or other intermediate information during execution of instructions to be executed by processor(s) 1504. Such instructions, when stored in non-transitory storage media accessible to processor(s) 1504, render computing system 1500 into a special-purpose machine that is customized to perform the operations specified in the instructions.

Computing system 1500 further includes a read only memory (ROM) 1508 or other static storage device coupled to bus 1502 for storing static information and instructions (e.g., VNF 402) for processor(s) 1504. A storage device 1510, e.g., a magnetic disk, optical disk or flash disk (made of flash memory chips), is provided and coupled to bus 1502 for storing information and instructions.

Computing system 1500 may be coupled via bus 1502 to a display 1512, e.g., a cathode ray tube (CRT), Liquid Crystal Display (LCD), Organic Light-Emitting Diode Display (OLED), Digital Light Processing Display (DLP) or the like, for displaying information to a computer user. An input device 1514, including alphanumeric and other keys, is coupled to bus 1502 for communicating information and command selections to processor(s) 1504. Another type of user input device is cursor control 1516, such as a mouse, a trackball, a trackpad, or cursor direction keys for communicating direction information and command selections to processor(s) 1504 and for controlling cursor movement on display 1512. The input device typically has two degrees of freedom in two axes, a first axis (e.g., x) and a second axis (e.g., y), that allows the device to specify positions in a plane.

Removable storage media 1540 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computing system 1500 may implement the techniques described herein using customized hard-wired logic, one or more ASICs or field programmable gate arrays (FPGAs), firmware or program logic which in combination with the computer system causes or programs computing system 1500 to be a special-purpose machine. According to one embodiment, the techniques herein are performed by computing system 1500 in response to processor(s) 1504 executing one or more sequences of one or more instructions (e.g., VNF 402) contained in main memory 1506. Such instructions may be read into main memory 1506 from another storage medium, such as storage device 1510. Execution of the sequences of instructions contained in main memory 1506 causes processor(s) 1504 to perform the process steps described herein. In alternative embodiments, hard-wired circuitry may be used in place of or in combination with software instructions.

The term "storage media" as used herein refers to any non-transitory machine readable media that store data or instructions that cause a machine to operate in a specific fashion. Such storage media may comprise non-volatile media or volatile media. Non-volatile media includes, for example, optical, magnetic or flash disks, such as storage device 1510. Volatile media includes dynamic memory, such as main memory 1506. Common forms of storage media include, for example, a flexible disk, a hard disk, a solid-state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1502. Transmission media can also take the form of acoustic or light waves, such as those generated during radio-wave and infra-red data communications.

Various forms of media may be involved in carrying one or more sequences of one or more instructions to processor(s) 1504 for execution. For example, the instructions may initially be carried on a magnetic disk or solid-state drive of a remote computer. The remote computer can load the instructions into its dynamic memory and send the instructions over a telephone line using a modem. A modem local to computer system 1500 can receive the data on the telephone line and use an infra-red transmitter to convert the data to an infra-red signal. An infra-red detector can receive the data carried in the infra-red signal and appropriate circuitry can place the data on bus 1502. Bus 1502 carries the data to main memory 1506, from which processor(s) 1504 retrieve and execute the instructions. The instructions received by main memory 1506 may optionally be stored on storage device 1510 either before or after execution by processor(s) 1504.

Computing system 1500 also includes a communication interface 1518 coupled to bus 1502. Communication interface 1518 provides a two-way data communication coupling to a network link 1520 that is connected to a local network 1522. For example, communication interface 1518 may be an integrated services digital network (ISDN) card, cable modem, satellite modem, or a modem to provide a data communication connection to a corresponding type of telephone line. As another example, communication interface 1518 may be a local area network (LAN) card to provide a data communication connection to a compatible LAN. Wireless links may also be implemented. In any such implementation, communication interface 1518 sends and receives electrical, electromagnetic or optical signals that carry digital data streams representing various types of information.

Network link 1520 typically provides data communication through one or more networks to other data devices. For example, network link 1520 may provide a connection through local network 1522 to a host computer 1524 or to data equipment operated by an Internet Service Provider (ISP) 1526. ISP 1526 in turn provides data communication services through the world-wide packet data communication network now commonly referred to as the "Internet" 1528. Local network 1522 and Internet 1528 both use electrical, electromagnetic or optical signals that carry digital data streams. The signals through the various networks and the signals on network link 1520 and through communication interface 1518, which carry the digital data to and from computing system 1500, are example forms of transmission media.

In an embodiment, network link 1520 may include one or more switches (e.g., switches 104, 106, . . . 108, and/or 420).

Computing system 1500 can send messages and receive data, including program code, through the network(s), network link 1520 and communication interface 1518. In the Internet example, a server 1530 might transmit a requested code for an application program through Internet 1528, ISP 1526, local network 1522 and communication interface 1518. The received code may be executed by processor(s) 1504 as it is received, or stored in storage device 1510, or other non-volatile storage for later execution.

All examples and illustrative references are non-limiting and should not be used to limit the applicability of the proposed approach to specific implementations and examples described herein and their equivalents. For simplicity, reference numbers may be repeated between various examples. This repetition is for clarity only and does not dictate a relationship between the respective examples. Finally, in view of this disclosure, particular features described in relation to one aspect or example may be applied to other disclosed aspects or examples of the disclosure, even though not specifically shown in the drawings or described in the text.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
   mapping, by a management plane function in a virtualized network function of a network function virtualization link level architecture of a computing system, a logical interface as a virtual interface in a control plane function of the virtualized network function;
   mapping, by the management plane function, a logical resource of the network function virtualization link level architecture as a shadow resource on one or more data plane functions of the virtualized network function, wherein a virtual link is formed by the logical interface, the shadow resource, and the virtual interface;
   receiving, by a selected one of the one of more data plane functions, a packet over the virtual link from a switch of the computing system and classifying a type of the packet;
   in response to the packet type being a data packet, the selected one of the one or more data plane functions aggregating the packet with other data packets to form aggregated data packets and sending the aggregated data packets to the switch;
   sending, in response to the packet type being a link aggregation control protocol packet, by the selected one of the one or more data plane functions, the packet to a virtual link controller of the control plane function to maintain a runtime state of the virtual link identified in the packet;
   detecting, by the virtual link controller, a failure of the virtualized network function; and
   setting, by the management plane function, a static state of the virtual link.

2. The method of claim 1, comprising sending, in response to the packet type being at least one of an address resolution protocol packet and an Internet protocol neighbor discovery packet, by the selected one of the one or more data plane functions, the packet to an Internet protocol neighbor manager in the control plane function to maintain a link layer address database.

3. The method of claim 1, comprising sending, in response to the packet type being a routing protocols packet, by the selected one of the one or more data plane functions, the packet to a routing protocols manager in the control plane function to process the routing protocols packet.

4. The method of claim 1, wherein the logical resource comprises a selected one of a network interface, a virtual local area network, one or more addresses, one or more routes, access control list/Internet protocol (ACL/IP) address pools, and one or more policies.

5. The method of claim 1, wherein the selected one of the one or more data plane functions forwards the packet.

6. The method of claim 1, comprising un-mapping, by the management plane function, the logical resource as the shadow resource on the one or more data plane functions of the virtualized network function.

7. The method of claim 1, comprising adding, by the management plane function, another data plane function to a link aggregation group including the virtual link.

8. The method of claim 1, wherein the logical resource is mapped to every data plane function of the virtualized network function.

9. The method of claim 1, comprising load balancing of packets received from the switch among the one or more data plane functions.

10. A non-transitory, machine readable medium storing instructions, which when executed by one or more processing resources, cause the one or more processing resources to:
    map, by a management plane function in a virtualized network function of a network function virtualization link level architecture of a computing system, a logical interface as a virtual interface in a control plane function of the virtualized network function;
    map, by the management plane function, a logical resource of the network function virtualization link level architecture as a shadow resource on one or more data plane functions of the virtualized network function, wherein a virtual link is formed by the logical interface, the shadow resource, and the virtual interface;
    receive, by a selected one of the one of more data plane functions, a packet over the virtual link from a switch of the computing system and classify a type of the packet;
    in response to the packet type being a data packet, the selected one of the one or more data plane functions to aggregate the packet with other data packets to form aggregated data packets and sending the aggregated data packets to the switch;
    send, in response to the packet type being a link aggregation control protocol packet, by the selected one of the one or more data plane functions, the packet to a virtual link controller of the control plane function to maintain a runtime state of the virtual link identified in the packet;
    detect, by the virtual link controller, a failure of the virtualized network function; and
    set, by the management plane function, a static state of the virtual link.

11. The non-transitory, machine readable medium of claim 10, wherein the instructions further cause the one or more processing resources to:
    send, in response to the packet type being at least one of an address resolution protocol packet and an Internet protocol neighbor discovery packet, by the selected one of the one or more data plane functions, the packet to an Internet protocol neighbor manager in the control plane function to maintain a link layer address database.

12. The non-transitory, machine readable medium of claim 10, wherein the instructions further cause the one or more processing resources to:
send, in response to the packet type being a routing protocols packet, by the selected one of the one or more data plane functions, the packet to a routing protocols manager.

13. The non-transitory, machine readable medium of claim 10, wherein the selected one of the one or more data plane functions forwards the packet.

14. The non-transitory, machine readable medium of claim 10, wherein the instructions further cause the one or more processing resources to add, by the management plane function, another data plane function to a link aggregation group including the virtual link.

15. An apparatus comprising:
hardware processing circuitry; and
instructions that when executed by the hardware processing circuitry cause the apparatus to:
map, by a management plane function in a virtualized network function of a network function virtualization link level architecture of a computing system, a logical interface as a virtual interface in a control plane function of the virtualized network function;
map, by the management plane function, a logical resource of the network function virtualization link level architecture as a shadow resource on one or more data plane functions of the virtualized network function, wherein a virtual link is formed by the logical interface, the shadow resource, and the virtual interface;
receive, by a selected one of the one of more data plane functions, a packet over the virtual link from a switch of the computing system and classify a type of the packet;
in response to the packet type being a data packet, the selected one of the one or more data plane functions to aggregate the packet with other data packets to form aggregated data packets and sending the aggregated data packets to the switch;
send, in response to the packet type being a link aggregation control protocol packet, by the selected one of the one or more data plane functions, the packet to a virtual link controller of the control plane function to maintain a runtime state of the virtual link identified in the packet;
detect, by the virtual link controller, a failure of the virtualized network function; and
set, by the management plane function, a static state of the virtual link.

16. The apparatus of claim 15, wherein the instructions further cause the hardware processing circuitry to forward, by the selected one of the one or more data plane functions, the packet.

17. The apparatus of claim 15, wherein the instructions further cause the hardware processing circuitry to un-map, by the management plane function, the logical resource as the shadow resource on the one or more data plane functions of the virtualized network function.

18. The apparatus of claim 15, wherein the instructions further cause the hardware processing circuitry to add, by the management plane function, another data plane function to a link aggregation group including the virtual link.

19. The apparatus of claim 15, wherein the selected one of the one or more data plane functions forwards the packet.

* * * * *